US008685505B2

(12) United States Patent
Garant

(10) Patent No.: US 8,685,505 B2
(45) Date of Patent: Apr. 1, 2014

(54) TEAR-RESISTANT PAPERBOARD LAMINATE AND STRUCTURE

(75) Inventor: Jacques Garant, Montreal (CA)

(73) Assignee: Emballages Stuart Inc., Montreal (CA)

( * ) Notice: Subject to any disclaimer, the term of this patent is extended or adjusted under 35 U.S.C. 154(b) by 0 days.

(21) Appl. No.: 13/696,681

(22) PCT Filed: May 6, 2011

(86) PCT No.: PCT/CA2011/000533
§ 371 (c)(1),
(2), (4) Date: Nov. 7, 2012

(87) PCT Pub. No.: WO2011/137526
PCT Pub. Date: Nov. 10, 2011

(65) Prior Publication Data
US 2013/0059098 A1  Mar. 7, 2013

Related U.S. Application Data

(60) Provisional application No. 61/332,411, filed on May 7, 2010.

(51) Int. Cl.
*B29D 22/00* (2006.01)
(52) U.S. Cl.
USPC .......................... 428/34.2; 428/34.3; 428/339
(58) Field of Classification Search
USPC ........................................ 428/34.2, 34.3, 339
See application file for complete search history.

(56) References Cited

U.S. PATENT DOCUMENTS

| 4,254,173 | A | 3/1981 | Peer |
| 5,244,702 | A | 9/1993 | Finestone et al. |
| 5,437,924 | A | 8/1995 | Decker, III et al. |
| 7,144,635 | B2 * | 12/2006 | Hawes et al. ............. 428/510 |
| 7,335,276 | B2 * | 2/2008 | Kawka et al. ............. 156/324 |
| 7,497,923 | B2 | 3/2009 | Ward et al. |
| 2001/0055655 | A1 | 12/2001 | Olvey |
| 2003/0091847 | A1 * | 5/2003 | Hawes et al. ............. 428/500 |
| 2004/0060655 | A1 * | 4/2004 | Kawka et al. ........... 156/309.6 |
| 2007/0077417 | A1 * | 4/2007 | Hawes ........................ 428/339 |
| 2007/0202324 | A2 * | 8/2007 | Hawes ........................ 428/339 |
| 2013/0059098 | A1 * | 3/2013 | Garant ....................... 428/34.3 |

FOREIGN PATENT DOCUMENTS

| EP | 1 586 447 A1 | 10/2005 |
| WO | WO 2007/035525 A2 | 3/2007 |

OTHER PUBLICATIONS

International Search Report and Written Opinion for PCT/CA2011/000533 mailed Aug. 8, 2011.

* cited by examiner

*Primary Examiner* — N. Edwards
(74) *Attorney, Agent, or Firm* — Wolf, Greenfield & Sacks, P.C.

(57) ABSTRACT

There is provided a dimensionally stable laminated paperboard material having a tear-resistant polymer film core. The tear-resistant paperboard laminate is a multi-layer paperboard laminate with an integral polymer core having a tear resistance a thickness of at least 1 mil and a tear resistance of at least 350 grams of force in machine direction and 400 grams of force in cross direction, as measured by the Elmendorf tear propagation test. Two paperboard substrates are bonded on respective opposite sides of the polymer core, to provide printability, facilitate adherence and prevent frictional resistance. The multi-layer paperboard-polymer-paperboard laminate is particularly useful for child-resistant, senior-friendly and pilfer-proof packaging and may be printed on, hot-stamped, embossed, die-cut and glued using conventional printing and converting techniques. An adhesive laminating process and an extrusion laminating process for manufacturing the laminate are also disclosed.

17 Claims, 23 Drawing Sheets

CROSS SECTION OF NEW TEAR RESISTANT LAMINATED BOARD

CROSS SECTION OF A CONVENTIONAL TEAR RESISTANT LAMINATED BOARD

CONVENTIONAL ADHESIVE LAMINATING PROCESS

CONVENTIONAL EXTRUSION LAMINATING PROCESS

CROSS SECTION OF NEW TEAR RESISTANT LAMINATED BOARD

NEW ADHESIVE LAMINATING PROCESS

NEW EXTRUSION LAMINATING PROCESS

TEAR-RESISTANT PAPERBOARD LAMINATE AND STRUCTURE

RELATED APPLICATIONS

This application is a National Stage Application of PCT/CA2011/000533 which claims priority under 35 U.S.C. §119(e) to U.S. Provisional Application Ser. No. 61/332,411, filed on May 7, 2010, which is herein incorporated by reference in its entirety.

FIELD OF THE INVENTION

The present invention relates to a laminate sheet construction and to structures made from the same. More particularly, the present invention relates to a laminated material having a cross-laminated tear-resistant polymer film core, to a method of manufacturing the same and to a structure made therefrom.

BACKGROUND OF THE INVENTION

Known in the art are cartons for packaging various consumer products. Such cartons are made substantially of a paperboard material, and often include separate components which are movable with respect to one another. For example, known in the art are drug dispensing cartons or the like, where an sleeve houses an inner sliding member, and the consumer product, i.e. tablets, capsules, etc., are packaged in the inner sliding member. In order to access the drug units, a consumer slides the sliding member out of the sleeve. The sliding member may be provided in the form of a paperboard card or drawer. The same sliding member or another sliding member may provide information (instructions, disclaimers, etc.) concerning the product, for example an information card or a small booklet which is slidably engaged with the sleeve of the packaging.

Moreover, conventional packaging materials, such as for packaging unit dose pharmaceuticals, lack high tear-resistance and burst-resistance, which are desirable characteristics for various packaging applications including pharmaceutical packaging. Child resistance is a feature particularly desirable for unit dose pharmaceutical packaging to ensure that the package has sufficient integrity against tampering by children.

Moreover, it is commonly known that packaging for pharmaceutical products must be accessible by a person using the medication, but also child-resistant. This presents a number of drawbacks, particularly when the recipient of the medication is lacking manual dexterity or strength.

There is thus a need for an improved package and packaging material for providing improved tolerance in packages.

Known in the art are various paperboard materials, including various tear-resistant paperboard materials, for manufacturing such packaging products. A conventional packaging is made of a tear-resistant paperboard laminate comprising a paperboard layer which is bonded to a tear-resistant polymer film such as polyethylene, polyester, or the like. The paperboard is clay coated, on the exposed side, for printability. Thus the resulting laminate has a clay coated paperboard side and a film side. The film side of the laminate has an adhesive quality, in that it has a "sticky" effect when in contact with another component. This texture is undesirable, namely in packaging such as the ones described above, where an inner sliding component (or "insert") is provided. Indeed, the stickiness of the film hinders the sliding motion of the insert, or of other movable parts in the packaging. Moreover, only the paperboard side of the laminate is printable. Therefore, if print is desired to appear on two sides of a substantially flat component of the packaging, the laminate material must be folded, which is results in a bulkier component and requires more of the laminate material. Moreover, the film side is not readily adherable. Therefore special adhesive substances and/or processes are required to adhere a component to the film side of the packaging, which results in increased manufacturing costs, etc. Furthermore, such conventional packaging material will tend to warp under certain conditions, such as high levels of humidity, etc., due to the asymmetry of the composition. This warping effect challenges the manufacturing of packages made with such materials and/or results in undesirable deformations in the final packages.

Moreover, despite advances in multi-layer film technology, the use of such films as the strength layer in a laminated structure with paperboard is still characterized by relatively poor tear characteristics. A conventional tear-resistant material has tear strength as measured by the Elmendorf tear propagation test of approximately 350 grams of force in machine direction and 400 grams of force in cross direction. The poor tear characteristics of the paperboard are imparted to the cross-laminated layers and the tear propagates through each of the layers.

Also, in fabricating products, the dissimilar materials of such laminates can present a number of problems including poor adhesion of the film to the paperboard surface, which can result in delaminating and other undesirable characteristics in the finished laminated product.

Accordingly, there is a need for a highly tear-resistant laminate with improved durability.

Hence, in light of the aforementioned, there is a need for an improved system which, by virtue of its design and components, would be able to overcome some of the above-discussed prior art concerns.

SUMMARY OF THE INVENTION

The object of the present invention is to provide a product and process which, by virtue of its design and components, satisfies some of the above-mentioned needs and is thus an improvement over other related packaging, tear-resistant paperboard materials and/or methods known in the prior art.

It is an object of the present invention to provide a packaging that is highly tear-resistant.

It is another object of the present invention to provide a packaging with improved operability.

It is another object of the present invention to provide a packaging with improved dimensional stability.

It is another object of the present invention to provide a packaging which provides double-sided printability with a minimum amount of material.

It is another object of the present invention to provide a laminated paperboard substrate for an improved packaging structure.

It is another object of the present invention to provide a laminated paperboard substrate for a packaging structure which is adherable on both sides.

It is another object of the present invention to provide a laminated paperboard substrate for packaging that is child-resistant, yet easily opened by the intended consumer.

It is yet another object of the invention to provide a laminated paperboard substrate for packaging wherein the strength needed to open the package can be controlled.

In accordance with the present invention, the above mentioned objects are achieved, as will be easily understood, by a tear-resistant paperboard laminate such as the one briefly described herein and such as the one exemplified in the accompanying drawings.

According to embodiments of the present invention, there is provided a dimensionally stable, multi-layer paperboard structure that may be processed with conventional folding carton manufacturing equipment and techniques to form a multitude of tear-resistant prototypes offering similar or superior characteristics than those of similar prototypes made with conventional non tear-resistant paperboards or even commonly available tear-resistant paperboards consisting of various selected polymer films laminated to one side or both sides of said tear-resistant paperboards. Those characteristics include, but are not limited to, high tear-resistance, dimensional stability, independent of the relative humidity of the environment, without curling or warping of the laminated substrate, excellent printability on both sides of laminated substrate, if required, lower coefficient of friction resulting in reduced resistance to sliding of plastic trays and inserts against the inner walls of sleeves and drug dispensing units and ease of gluing both sides of laminated substrate with conventional adhesives and equipment at optimum rated speeds.

According to an aspect of the present invention, there is provided a tear-resistant paperboard laminate for making a tear-resistant packaging structure. The tear-resistant paperboard laminate includes a tear-resistant polymer core layer having first and second opposite sides. The tear-resistant paperboard laminate further includes a first paperboard layer bonded to the first side of the tear-resistant polymer core layer, with a first bonding medium. The tear-resistant paperboard laminate further includes a second paperboard layer bonded to the second side of the tear-resistant polymer core layer, with a second bonding medium. The tear-resistant polymer core layer has a tear resistance of at least 350 grams of force in machine direction and of at least 400 grams of force in cross direction, as measured by the Elmendorf tear propagation test.

According to another aspect of the present invention, there is provided a packaging structure being made substantially of the tear-resistant paperboard laminate according to the present invention.

According to yet another aspect of the present invention, there is provided a packaging structure comprising a first component and a second component being in sliding engagement with the first component, wherein at least one of the first and second components is made substantially of the tear-resistant paperboard laminate according to the present invention. Preferably, the first component forms a sleeve made substantially of the tear-resistant paperboard laminate according to the present invention and the second component forms an insert to slide along an inner wall of the sleeve. Preferably, the sleeve substantially encases the insert which is slidably engaged with inner walls of the sleeve. There may be provided one or more inserts being substantially made of the tear-resistant paperboard laminate according to the present invention.

According to another aspect of the present invention, there is provided a use of the tear-resistant paperboard laminate according to the present invention for making a packaging structure.

According to another aspect of the present invention, there is provided a dimensionally stable tear-resistant paperboard laminate for making a tear-resistant packaging structure. The dimensionally stable tear-resistant paperboard laminate includes a tear-resistant polymer core layer having first and second opposite sides. The dimensionally stable tear-resistant paperboard laminate further includes a first paperboard layer bonded to the first side of said tear-resistant polymer core layer, with a first bonding medium. The dimensionally stable tear-resistant paperboard laminate further includes a second paperboard layer bonded to the second side of the tear-resistant polymer core layer, with a second bonding medium. The tear-resistant polymer core layer has a thickness of at least 1 mil and a tear resistance of at least 350 grams of force in machine direction and of at least 400 grams of force in cross direction, as measured by the Elmendorf tear propagation test, as measured by the Elmendorf tear propagation test. Moreover, the first and second paperboard layers are substantially structurally identical.

Preferably, the tear-resistant polymer core layer has a thickness of approximately 3 mils and a tear resistance of about 1700 grams of force in machine direction and about 400 grams of force in cross direction, as measured by the Elmendorf tear propagation test.

According to another aspect of the present invention, there is provided a method of manufacturing a tear-resistant paperboard laminate. The method comprises steps of (a) providing a tear-resistant polymer core layer having first and second opposite sides, the tear-resistant polymer core layer having a tear resistance of at least 350 grams of force in machine direction and of at least 400 grams of force in cross direction, as measured by the Elmendorf tear propagation test; (b) bonding, with a first bonding medium, a first paperboard layer to the first side of the tear-resistant polymer core layer; and (c) bonding, with a second bonding medium, a second paperboard layer to the second side of the tear-resistant polymer core layer.

Preferably, the tear-resistant polymer core layer is corona treated on both sides, prior to lamination. The film is either purchased already corona treated or the corona treatmay may be done on the laminator, if such a corona treatment station is available on the machine.

Preferably, the bonding of at least one of steps (b) and (c) comprises applying an adhesive with a nip roller.

Still preferably, the bonding of at least one of steps (b) and (c) comprises applying an adhesive with an anilox roller.

Still preferably, the bonding of at least one of steps (b) and (c) comprises applying by extrusion, molten LDPE (Low Density Polyethylene) with one or more corresponding extruder and associated pressure rollers.

Still preferably, the bonding of step (b) is executed in tandem with the bonding of step (c).

Still preferably, the bonding of steps (b) and (c) are executed in a single laminating pass.

Embodiments of the present invention are advantageous in that a packaging laminate is formed from two outer layers of paperboards laminated to both sides of an integral tear-resistant polymer substrate (i.e. core), with a suitable bonding layer applied to both sides of the polymer substrate. Packages having sliding components, according to embodiments of the present invention, are improved by virtue of two outer layers of paperboard which promote the sliding relationship between the components, in contrast to conventional packaging where the film is exposed on one side of the laminate material, Moreover, embodiments of the present invention exhibit the additional advantage of being clay-coated on both sides, if required, and thus printable (i.e. lithography carton), and also readily glueable on both sides. Accordingly, they are suited to consumer packaging applications, for example, for packaging of unit dose pharmaceuticals.

Moreover, embodiments of the present invention provide a tear-resistant paperboard with the same or superior strength properties with added dimensional stability and processing capabilities when compared to other conventional tear-resistant paperboards. Indeed, the 1 mil tear-resistant polymer core preferably has a tear resistance of approximately 350 grams of force in machine direction and 400 grams of force in cross direction, while the 3 mil tear-resistant polymer core layer preferably has a tear resistance of approximately 1700 grams of force in machine direction and 1050 grams of force in cross direction.

Other aspects, objects, advantages and features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS OF THE INVENTION

In the following description, the same numerical references refer to similar elements. The embodiments, geometrical configurations, materials mentioned and/or dimensions shown in the figures or described in the present description are preferred embodiments only, given for exemplification purposes only.

In the context of the present invention, any equivalent expression and/or compound words thereof known in the art will be used interchangeably, as apparent to a person skilled in the art. Furthermore, although the preferred embodiment of the present invention as illustrated in the accompanying drawings comprises components such as clay coatings, liquid adhesive, molten LDPE, etc., and although the preferred embodiment of the tear-resistant paperboard laminate and corresponding parts thereof consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations therebetween, as well as other suitable geometrical configurations may be used for the tear-resistant paperboard laminate according to the present invention, as will be briefly explained herein and as can be easily inferred herefrom, by a person skilled in the art, without departing from the scope of the invention.

Furthermore, the order of the steps of the method described herein should not be taken as to limit the scope of the invention, as the sequence of the steps may vary in a number of ways, without affecting the scope or working of the invention, as can also be understood.

Figure 1:
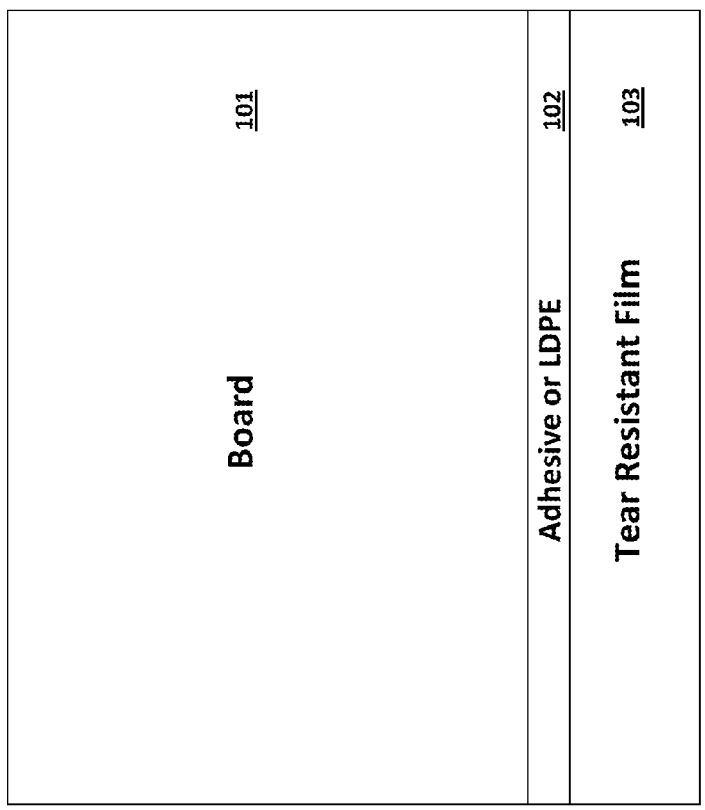
FIG. 1 is a cross-sectional view of a conventional tear-resistant paperboard laminate.

Referring to FIG. 1, there is illustrated a conventional tear-resistant paperboard laminate, shown in a cross-sectional view. Such a conventional tear-resistant paperboard laminate usually comprises three distinct layers. First, a top board layer (101) consisting of a two sided paperboard with clay coated top first side and uncoated second side. The second layer (102) is a bonding or tie layer consisting of a liquid adhesive, molten LDPE, or the like, laminating together the uncoated second side of the top paperboard to one side of the tear-resistant layer. The third or bottom layer (103) is the tear-resistant layer consisting usually of a tear-resistant polymer film such as polyethylene, polyester, or the like.

Figure 2:
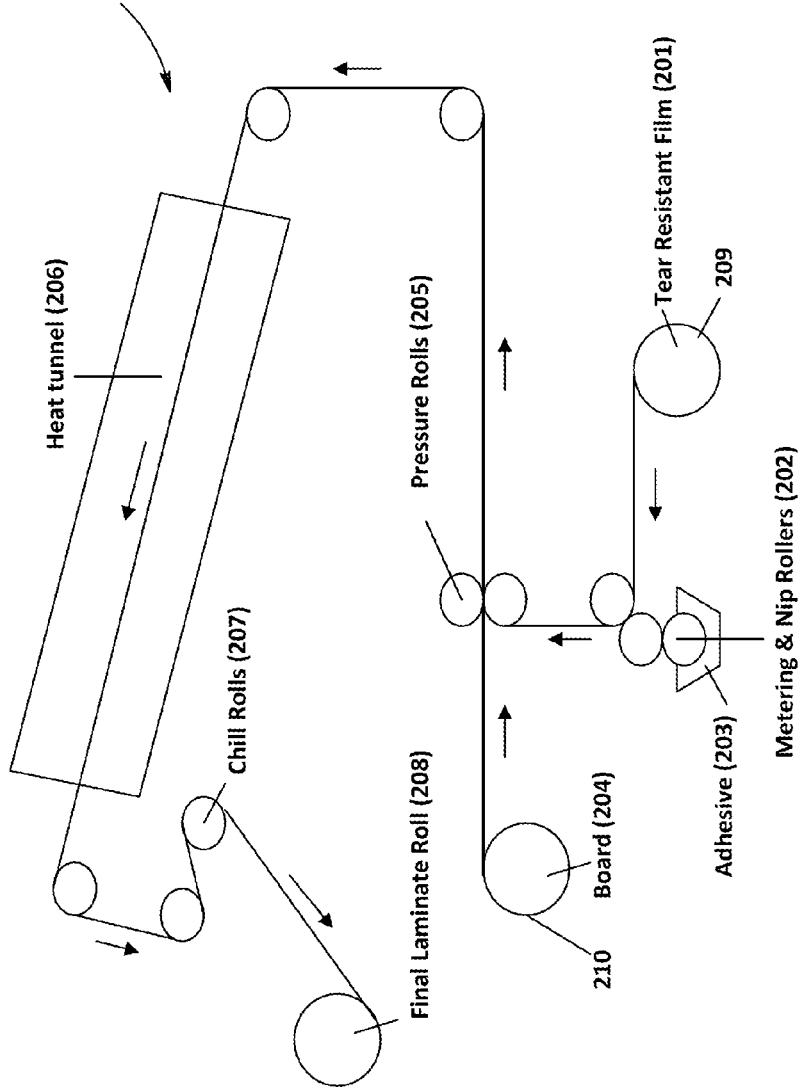
FIG. 2 is a schematic diagram representing a conventional adhesive laminating process for making a conventional tear-resistant paperboard laminate.

A conventional method of manufacturing such laminate materials includes an adhesive laminating process, as better illustrated in FIG. 2. According to such a process, a two-sided tear-resistant film (201) travels from an unwind roll (209) to metering & nip rollers (202). The first side of the tear-resistant film (201) is coated with liquid adhesive (203) by the nip roller (202). The adhesive coated tear-resistant film (201) travels to pressure rolls (205). A board (204) travels from an unwind roll (210) to pressure rollers (205). The adhesive-coated first side of tear-resistant film (201) comes in contact with the uncoated second side of the board (204) and they both enter between pressure rolls (205) to be joined together. The double layered board-film laminate from pressure rolls (205) travels through multiple rolls to the heat tunnel (206) where the adhesive of the laminate is properly cured and set.

The cured double-layered board-film laminate come out the heat tunnel (206) and travels through chill rolls (207) for cooling before being transferred to the final laminate rewind roll (208).

Figure 3:
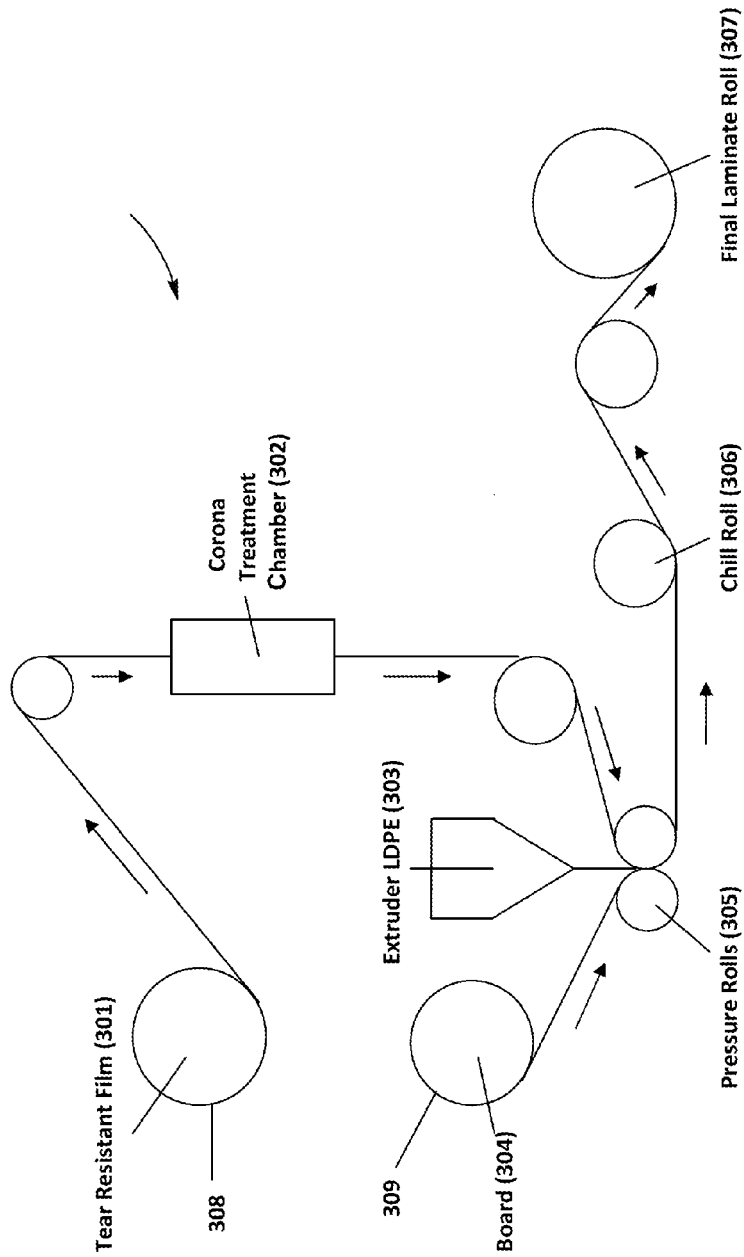
FIG. 3 is a schematic diagram representing a conventional extrusion laminating process for making a conventional tear-resistant paperboard laminate.

Another conventional method of manufacturing such laminate materials includes an extrusion laminating process, as better illustrated in FIG. 3. According to such a process, a two-sided tear-resistant film (301) travels from an unwind roll (308) to a corona treatment chamber (302) to increase the surface tension or dyne level of the film. The two sided tear-resistant film (301) comes out of the corona treatment chamber (302) and travels to an extruder unit (303) to be coated with molten LDPE. The first side of the tear-resistant film (301) is coated with molten LDPE (303). The molten-LDPE-coated tear-resistant film (301) travels to pressure rolls (305). A board (304) travels from unwind roll (309) to pressure rollers (305). The molten-LDPE-coated first side of the tear-resistant film (301) comes in contact with the uncoated second side of board (304) and they both enter between pressure rolls (305) to be joined together. The double-layered board-film laminate from pressure rolls (305) then travels through a chill roll (306) for cooling before being transferred to the final laminate rewind roll (307).

Figure 4:
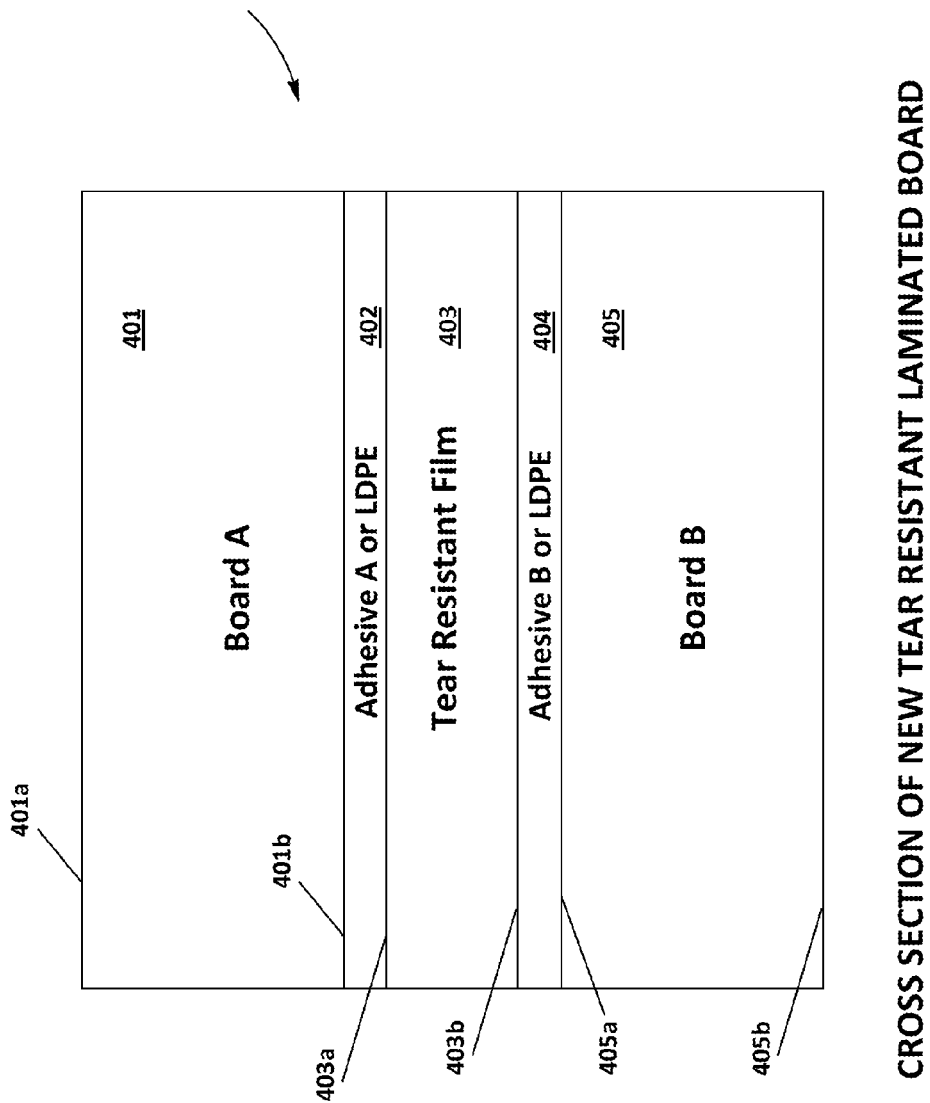
FIG. 4 is a cross-sectional view of a tear-resistant paperboard laminate, according to an embodiment of the present invention.
Figure 5:
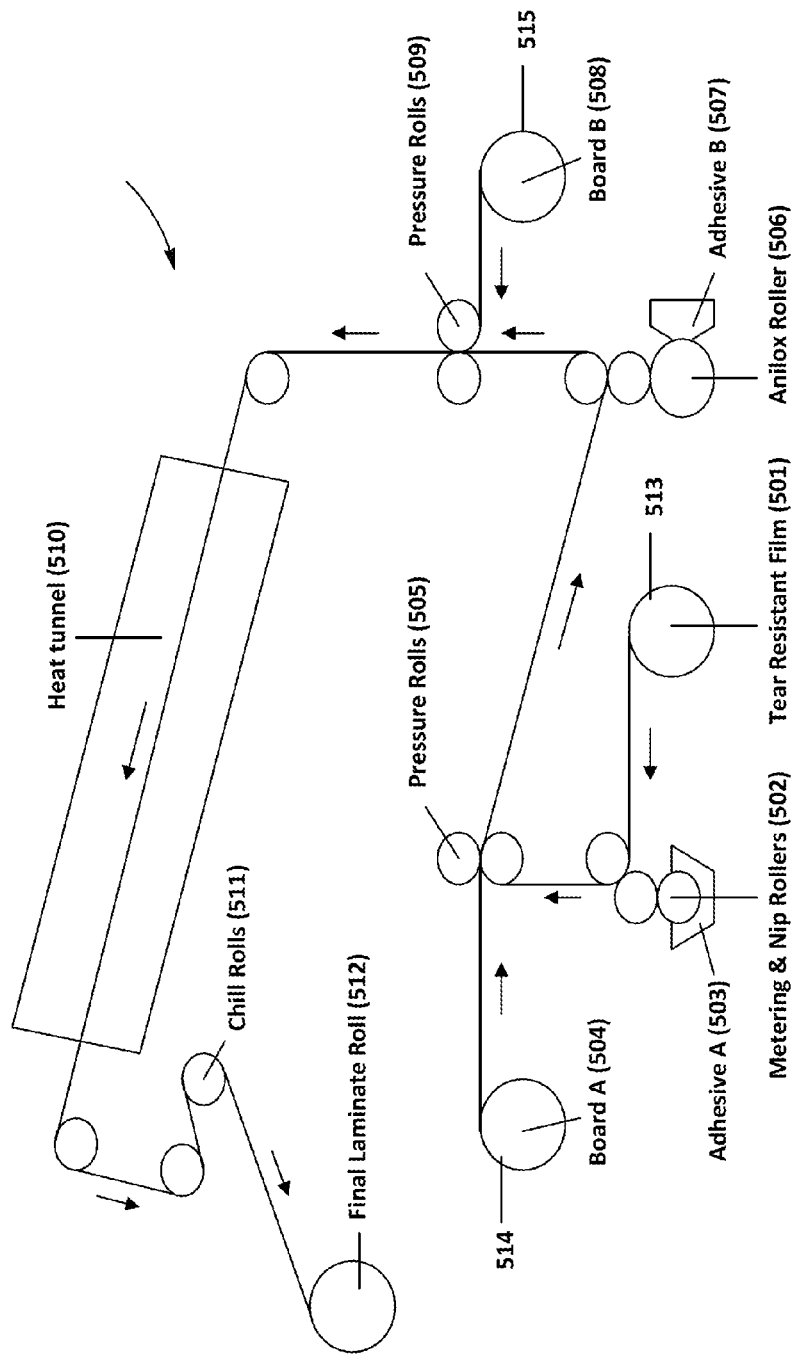
FIG. 5 is a schematic diagram representing an adhesive laminating process for making a tear-resistant paperboard laminate, according to an embodiment of the present invention.
Figure 6:
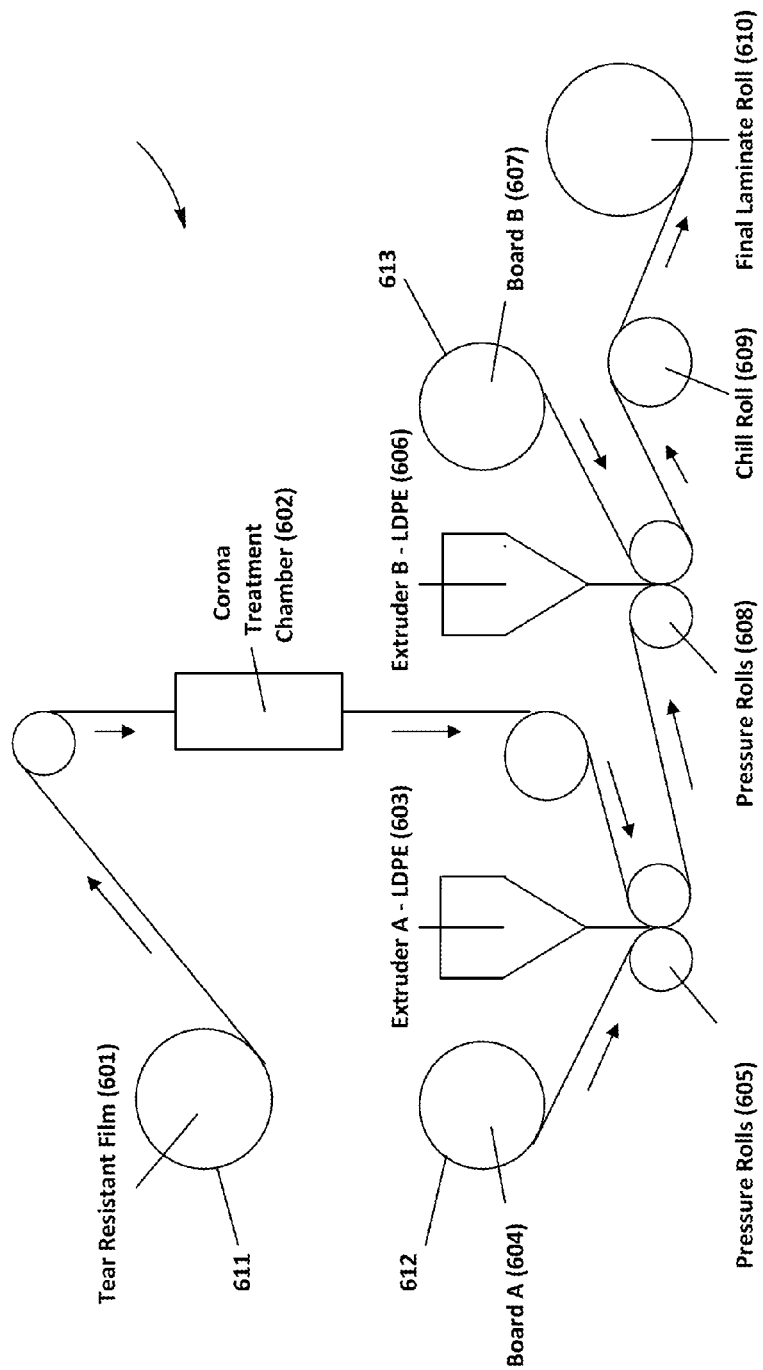
FIG. 6 is a schematic diagram representing an extrusion laminating process for making a tear-resistant paperboard laminate, according to another embodiment of the present invention.
Figure 7:
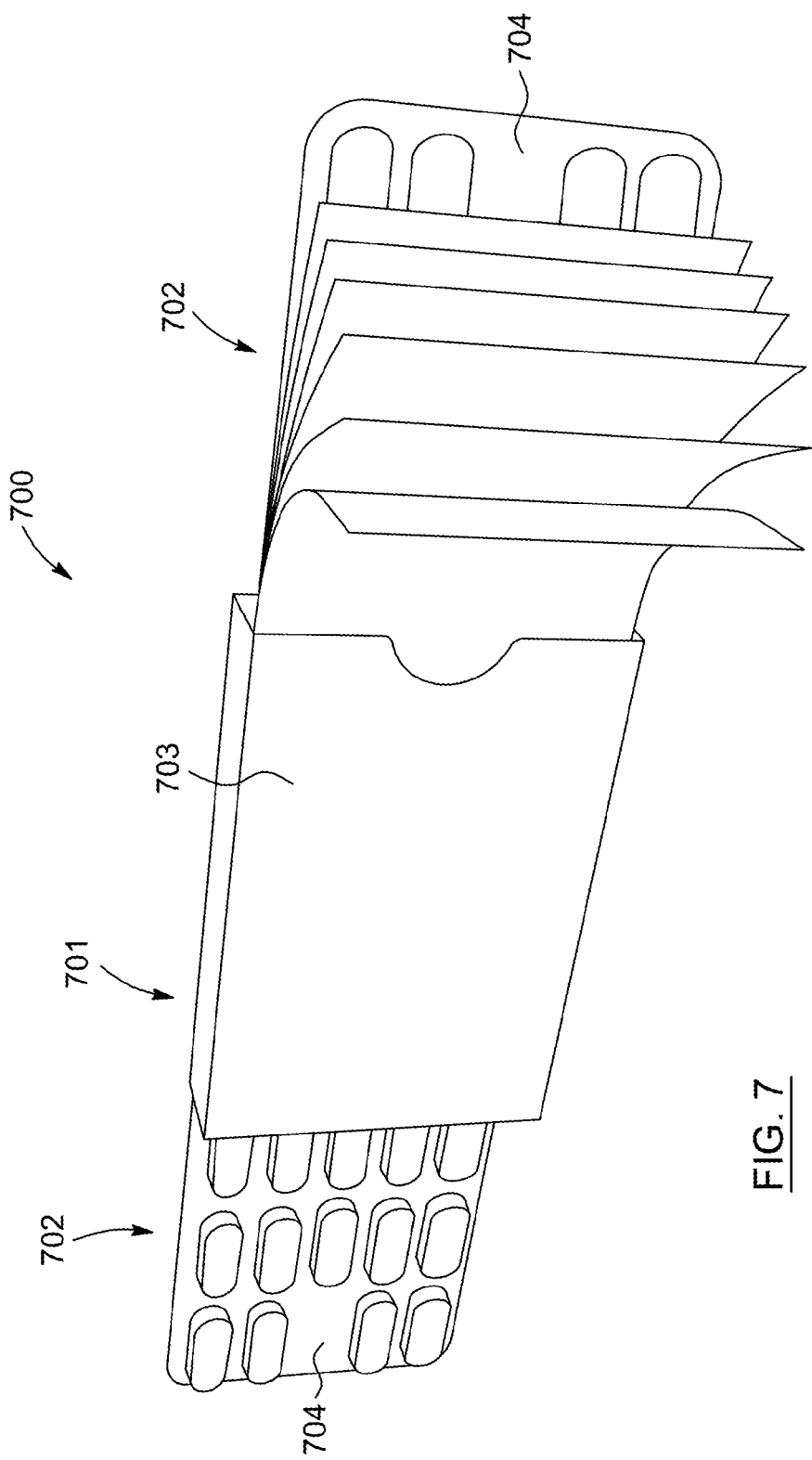
FIG. 7 shows a packaging structure according to an embodiment of the present invention.
Figure 8:
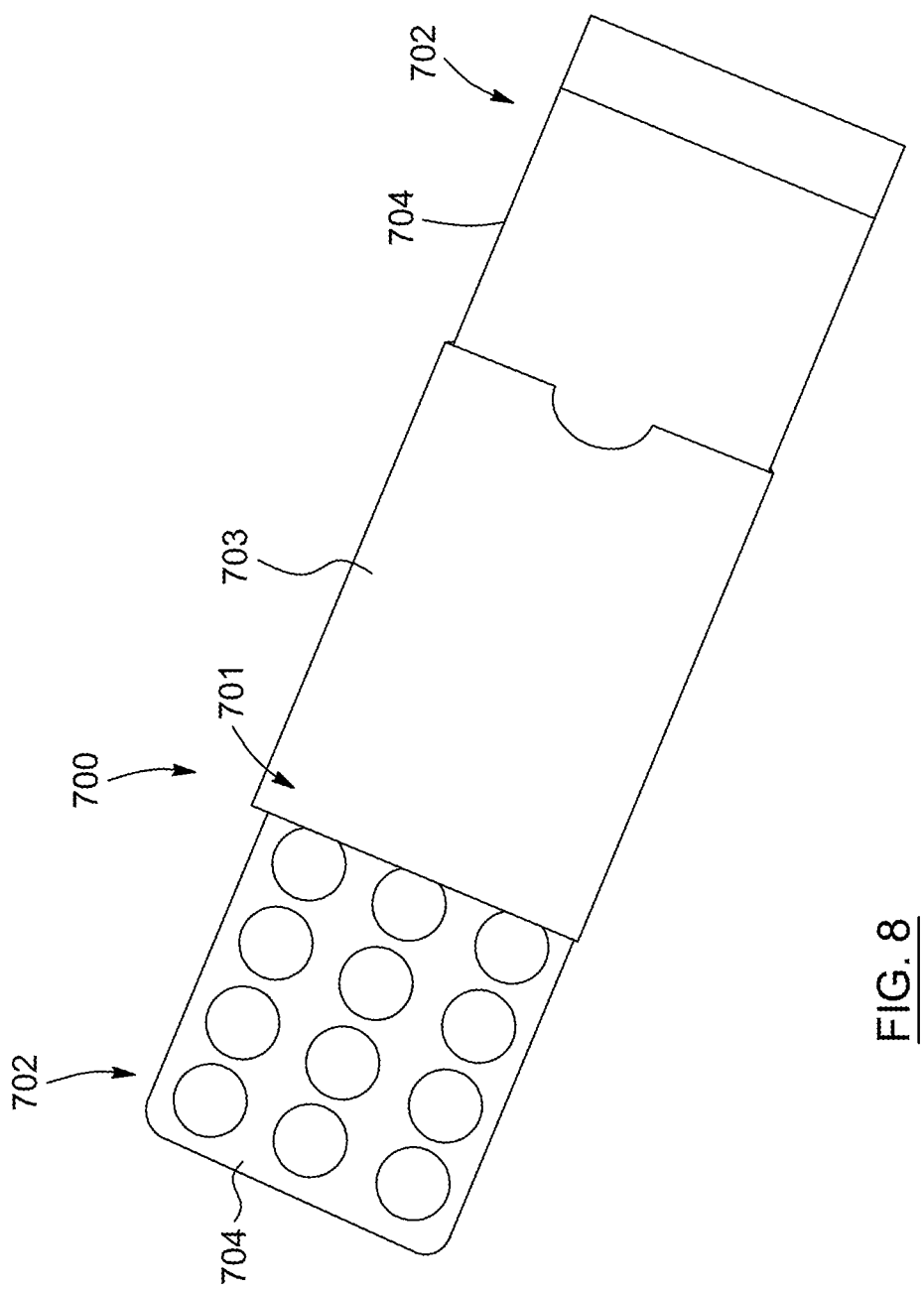
FIG. 8 shows a packaging structure according to another embodiment of the present invention.
Figure 9:
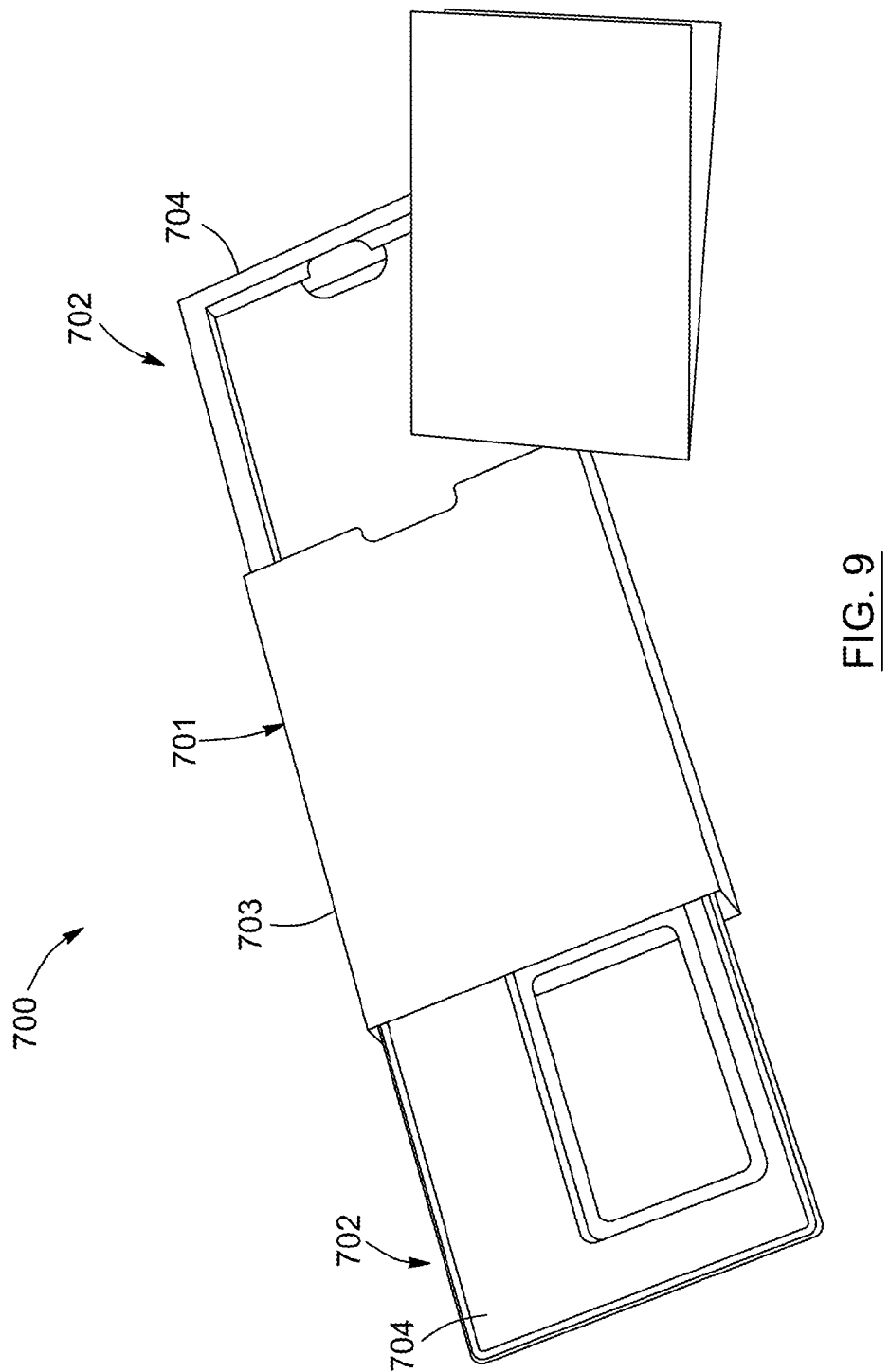
FIG. 9 shows a packaging structure according to another embodiment of the present invention.
Figure 10:
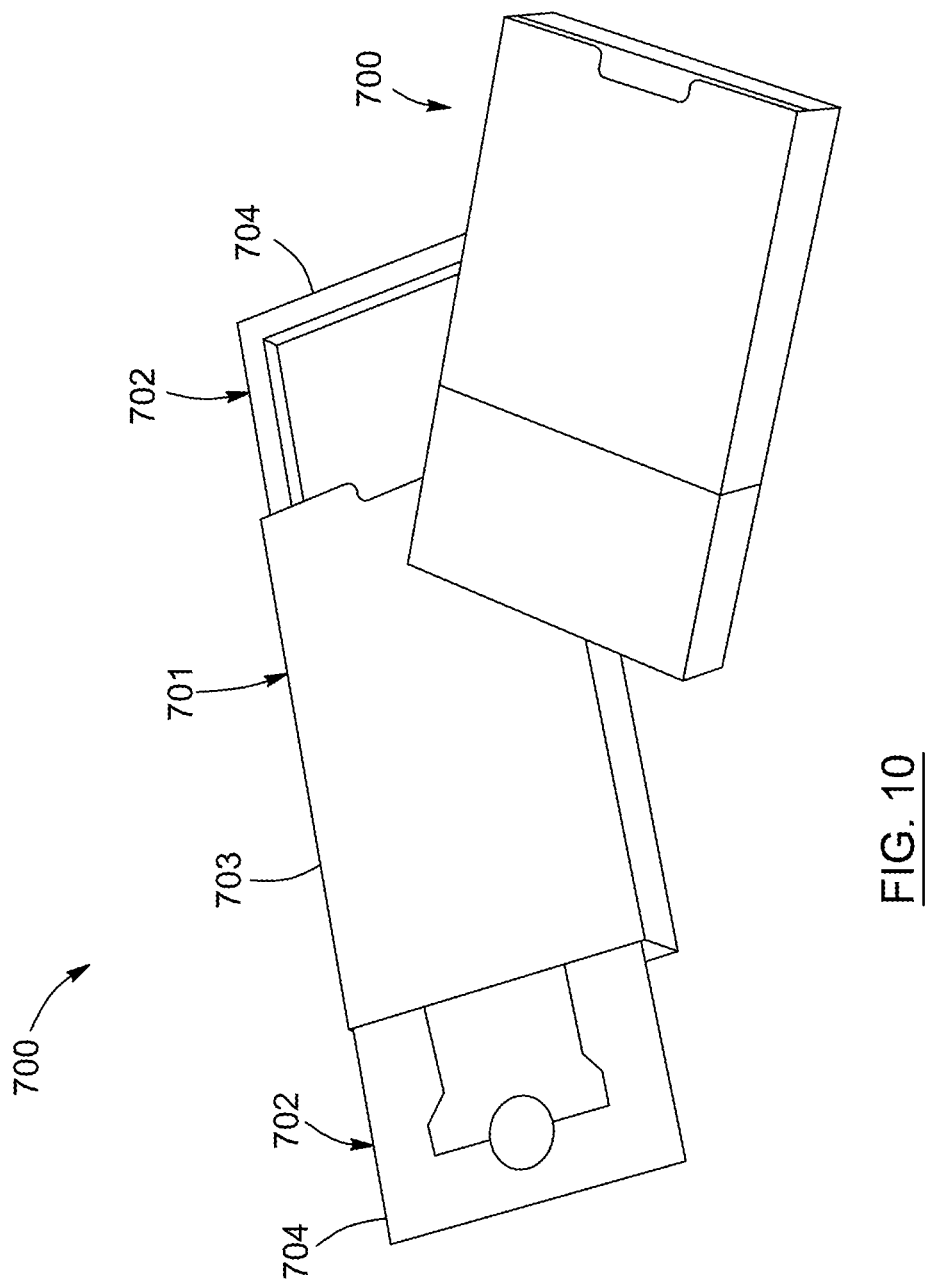
FIG. 10 shows packaging structures according to yet another embodiment of the present invention.
Figure 11:
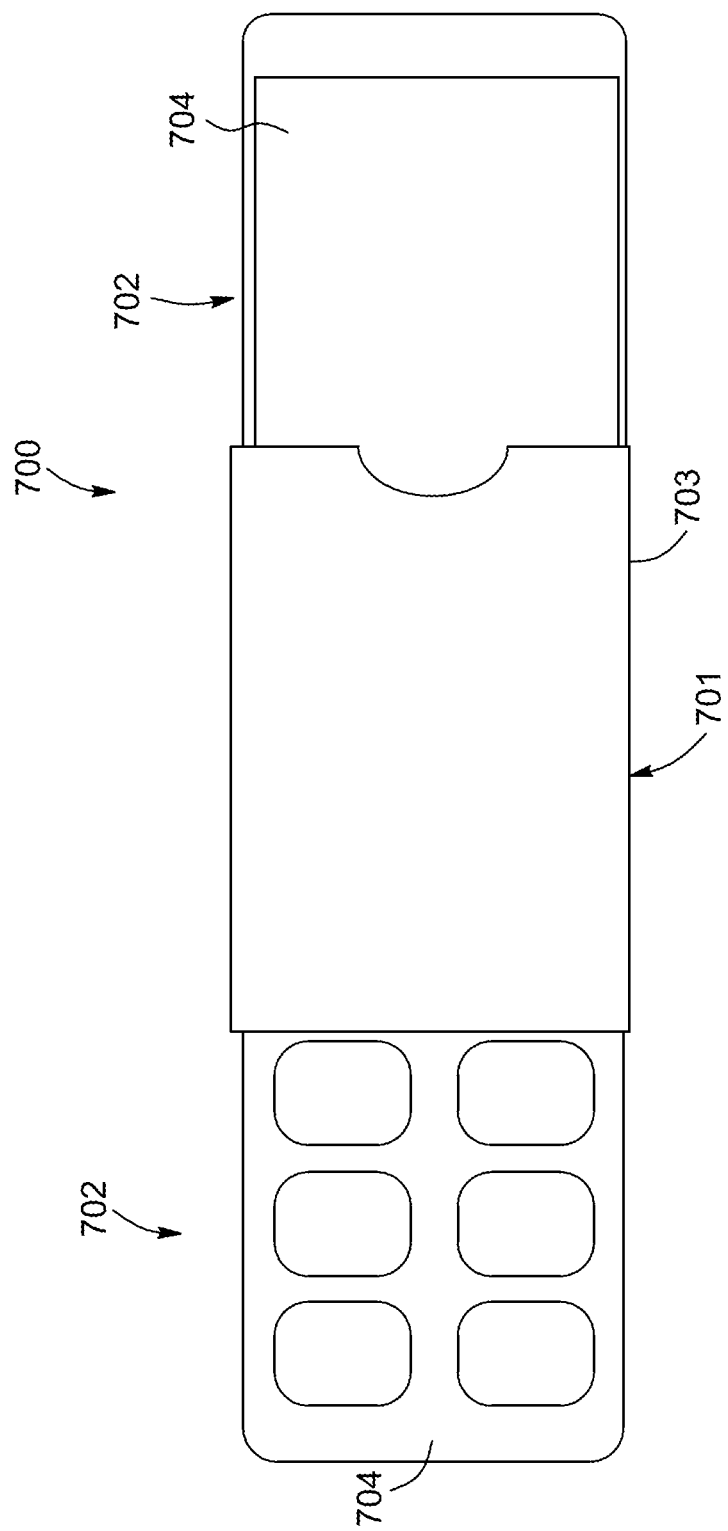
FIG. 11 shows a packaging structure according to yet another embodiment of the present invention.
Figure 12:
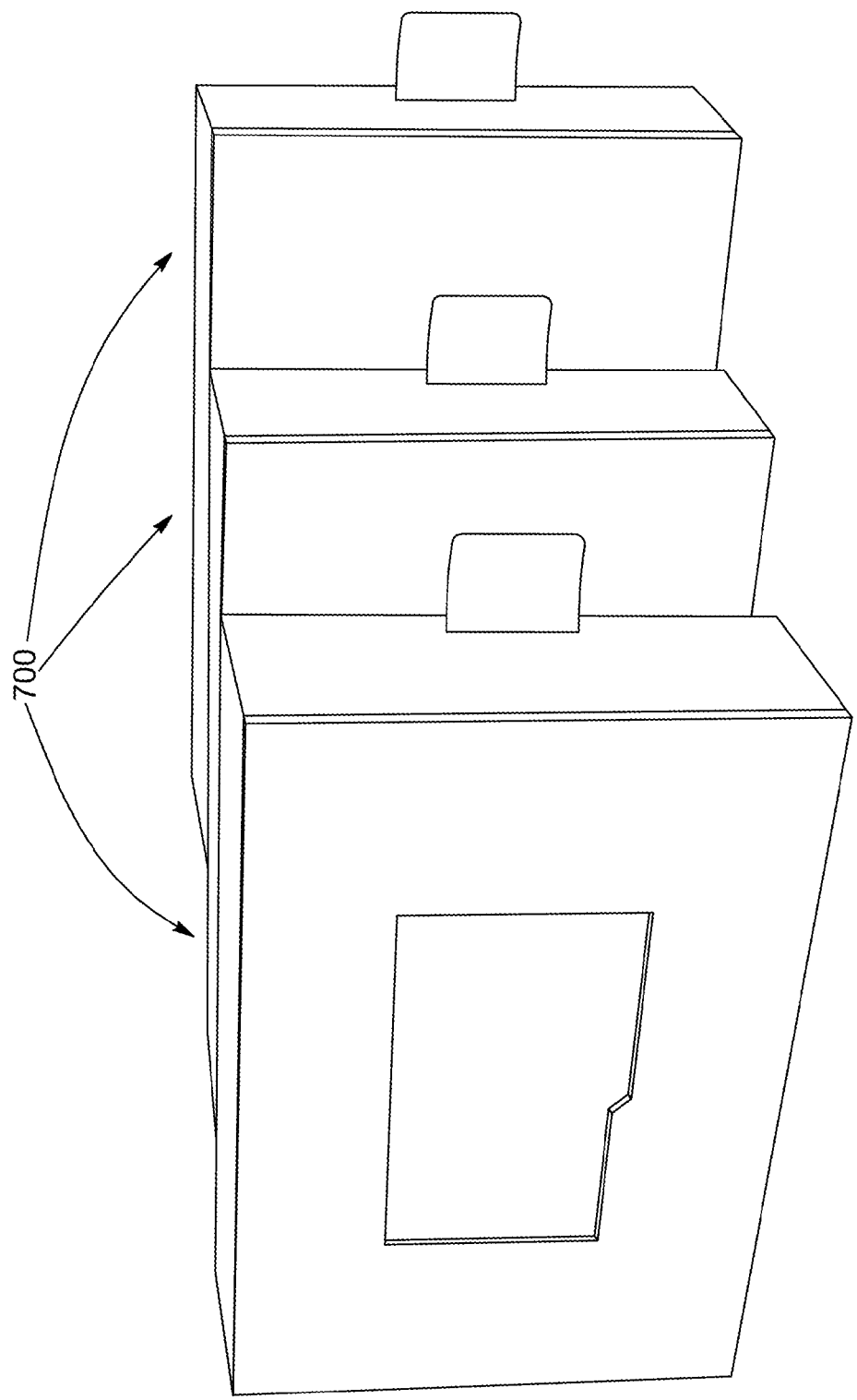
FIG. 12 shows packaging structures according to yet another embodiment of the present invention.
Figure 13:
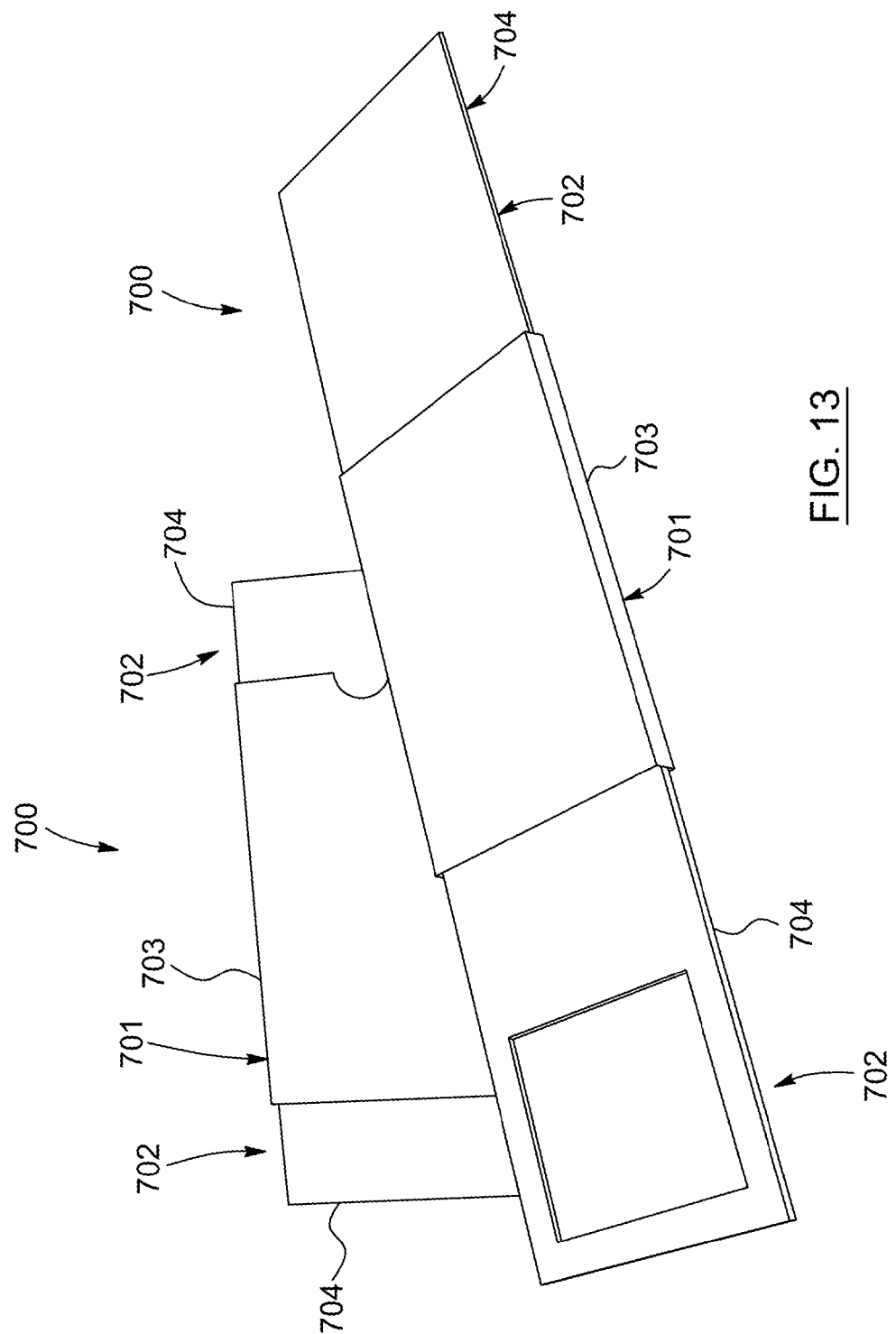
FIG. 13 shows packaging structures according to yet another embodiment of the present invention.
Figure 14:
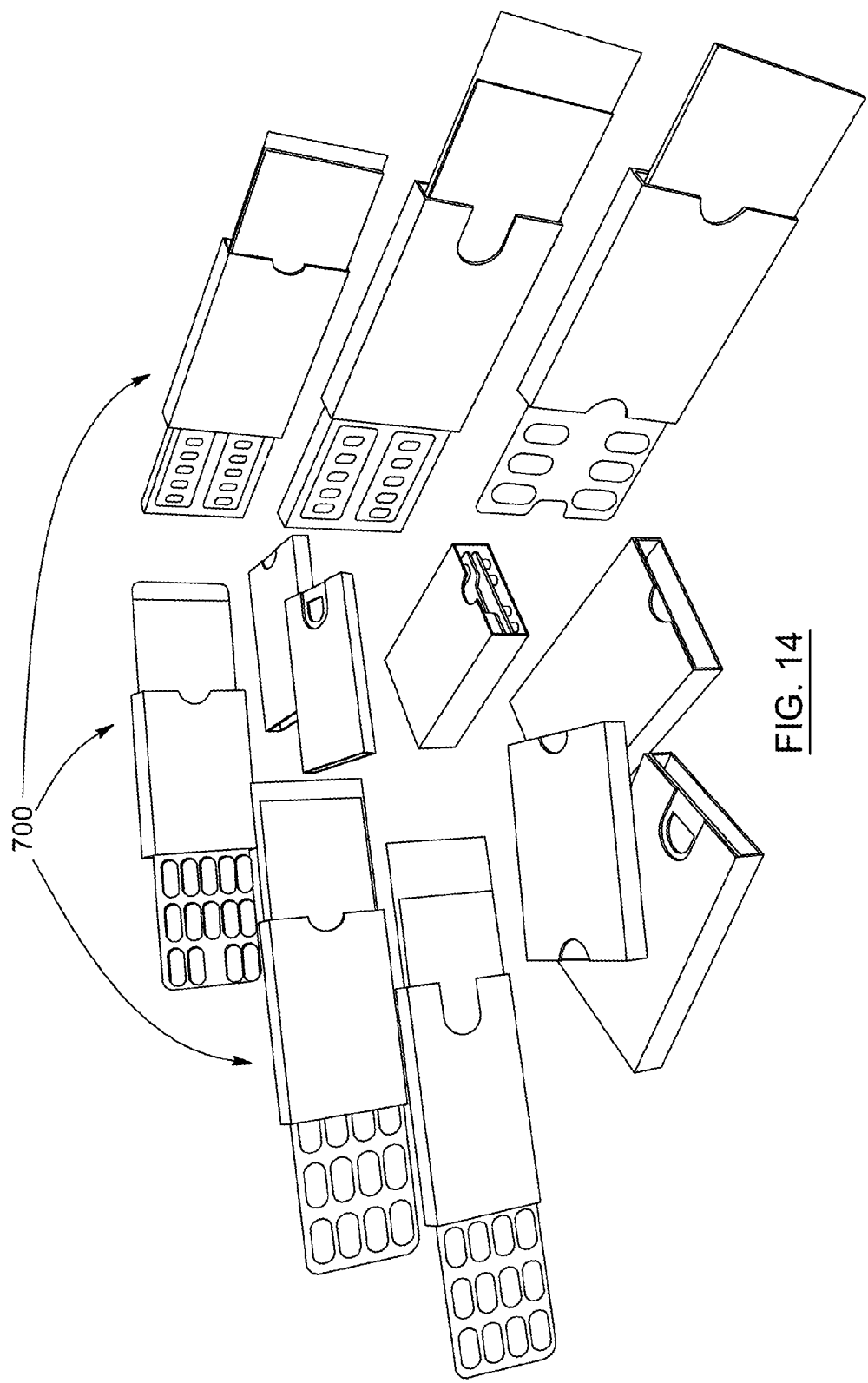
FIG. 14 shows packaging structures according to yet another embodiment of the present invention.
Figure 15:
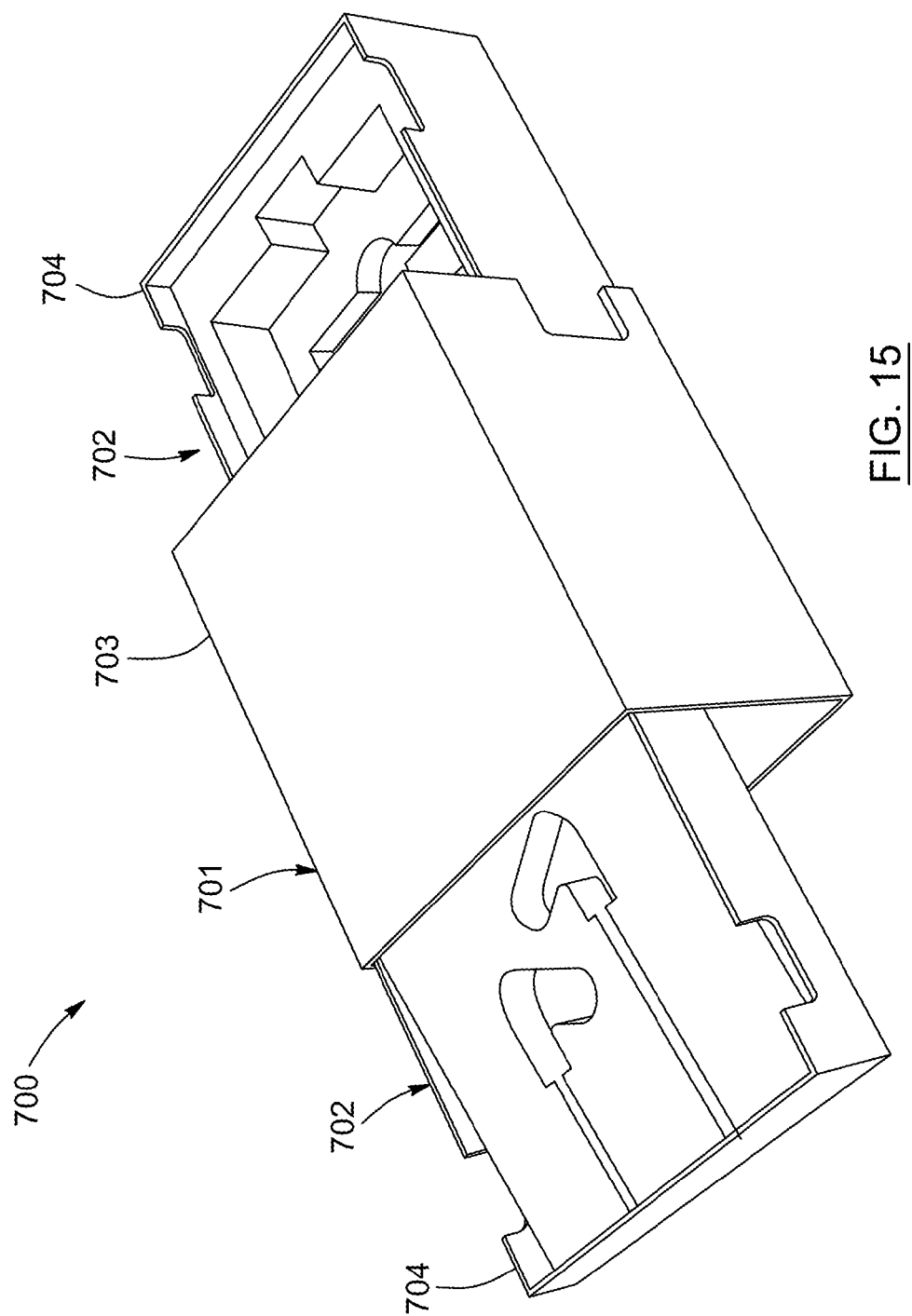
FIG. 15 shows a packaging structure according to yet another embodiment of the present invention.
Figure 16:
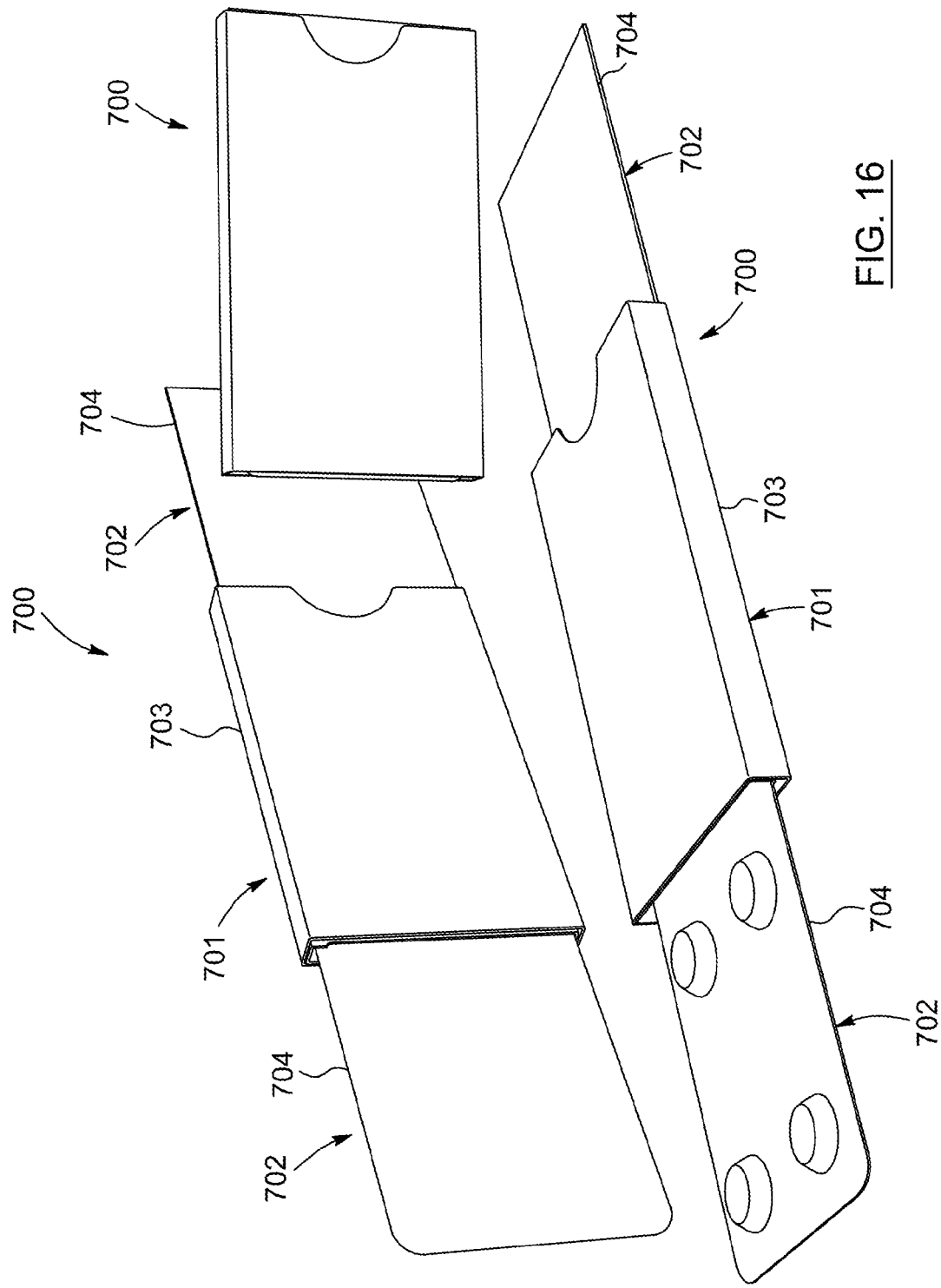
FIG. 16 shows packaging structures according to yet another embodiment of the present invention.

In contrast to conventional products and methods known in the art, the tear-resistant paperboard laminate according to the present invention, as exemplified in the accompanying drawings, namely FIG. 4 to 6, is a multi-layer paperboard laminate with an integral polymer core having a high resistance to tearing. Preferably, the tear-resistant paperboard laminate is a multi-layer paperboard laminate with an integral polymer core, preferably a 3 mil film, having a high resistance to tearing, preferably a tear resistance of at least 1700 grams of force in machine direction and of at least 400 grams of force in cross direction, as measured by the Elmendorf tear propagation test. The paperboard laminate comprises a first paperboard layer having a first clay-coated side and second uncoated side, an integral multi-layer, cross-directionally laminated construction of high-density polyethylene core having first and second sides such that the first side of said polymer layer is permanently bound to the second uncoated side of the said first paperboard layer and, finally, a second paperboard layer having a first clay-coated side and second uncoated side such that the second side of said polymer layer is permanently bound to the second uncoated side of said second paperboard layer.

Referring to FIG. 4, there is shown a tear-resistant paperboard laminate (400) for making a tear-resistant packaging structure, according to an embodiment of the present invention. The tear-resistant paperboard laminate (400) includes a tear-resistant polymer core layer (403) having first and second opposite sides (403a, 403b). The tear-resistant paperboard laminate further includes a first paperboard layer (401) bonded to the first side (403a) of the tear-resistant polymer core layer (403), with a first bonding medium (402). The laminate (400) further includes a second paperboard layer (405) bonded to the second side (403b) of the tear-resistant polymer core layer (403), with a second bonding medium (404). The tear-resistant polymer core layer (403) has a tear resistance as follows: the 1 mil tear-resistant polymer core having a tear resistance of approximately 350 grams of force in machine direction and 400 grams of force in cross direction; while the 3 mil tear-resistant polymer core layer has a tear resistance of approximately 1700 grams of force in machine direction and 1050 grams of force in cross direction, as measured by the Elmendorf tear propagation test.

Preferably, at least one of the first paperboard layer and the second paperboard layer is clay coated on an external side thereof, for providing printability. The first and/or second bonding media may comprise an adhesive material. Moreover, the first and/or second bonding media may comprise extrusion-applied molten LDPE. The first and/or second paperboard layer may comprise a substrate which may be: SBS (Solid Bleached Sulfate) 0.008" or 0.010", C1S (Coated 1 Side) board, CCNB (Clay Coated News Back) recycled board 0.008" or 0.010", and DWL (Double White Lined) board 0.008" or 0.010".

Preferably, the tear-resistant polymer layer core is made of at least one of Valeron™, polyester, polyamide or polyurethane films. Moreover, the tear-resistant polymer layer core preferably has a thickness ranging from 1 to 3 mils. As previously mentioned, the 1 mil tear-resistant polymer core layer has a tear resistance of approximately 350 grams of force in machine direction and 400 grams of force in cross direction, while the 3 mil tear-resistant polymer core layer has a tear resistance of approximately 1700 grams of force in machine direction and 1050 grams of force in cross direction, as measured by the Elmendorf tear propagation test.

The tear-resistant paperboard laminate shown in FIG. 4 comprises five distinct layers, namely:

- a first top board layer (401) consisting of a two-sided paperboard (A) with a clay coated top first side (401a) and an uncoated second side (401b);
- a second layer (402) providing a bonding or tie layer and consisting of a liquid adhesive, molten LDPE, or the like, thereby laminating together the uncoated second side (401b) of the top paperboard (A) to one side (403a) of a tear-resistant layer (403);
- the third or center layer (403) including a tear-resistant core consisting of a tear-resistant polymer film such as an integral multi-layer, cross-directionally laminated construction of high-density polyethylene, polyester, and/or the like;
- a fourth layer (404) forming a bonding or tie layer consisting of a liquid adhesive, molten LDPE, or the like, laminating together one side (403b) of the tear-resistant layer (403) with the uncoated second side (405a) of a bottom paperboard (B); and
- a fifth or bottom layer (405) consisting of the two-sided paperboard (B) with a clay coated bottom first side (405b) and uncoated second side (405a).

The first top board layer (401) consists of a two sided paperboard (A) with a clay coated top first side (401a) for providing printability, and an uncoated second side (401b). The paperboard substrate used for the top board layer (401) may be SBS (Solid Bleached Sulfate) 0.008" or 0.010", CIS (Coated 1 Side) board, CCNB (Clay Coated News Back) recycled board 0.008" or 0.010", and DWL (Double White Lined) board 0.008" or 0.010".

The second layer (402) is a bonding or tie layer consisting of an adhesive, molten LDPE, or the like, laminating together the uncoated second side (401b) of the top paperboard (A) to one side (403a) of the tear-resistant layer (403). If adhesive lamination is used, any suitable liquid adhesive may be used, such as ethylene vinyl acetate, polyurethane, acrylic or acrylate polymers and/or the like.

The third or center layer (403) is the tear-resistant core consisting of a tear-resistant polymer film such as a multi-layer, cross-directionally laminated construction of high-density polyethylene, polyester, or the like. The tear-resistant polymer layer core (403) may be a corona treated integral multi-layer, cross-directionally laminated construction of high-density polyethylene, known as Valeron™ Strength Film, and may have a thickness ranging from 1 to 3 mils. The laminate tear strength may be controlled by varying the film weight of the tear-resistant polymer layer (403) as an increase in tear-resistance results from an increase in film weight. Preferably, the tear-resistant polymer layer core (403) has a tear resistance of approximately 1700 grams of force in machine direction and 1050 grams of force in cross direction, as measured by the Elmendorf tear propagation test.

The fourth layer (404) is a bonding or tie layer consisting of an adhesive, molten LDPE, or the like, laminating together one side (403b) of the tear-resistant layer (403) with the uncoated second side (405a) of the bottom paperboard layer. If adhesive lamination is used, any suitable liquid adhesive may be used, such as ethylene vinyl acetate, polyurethane, acrylic or acrylate polymers and the like.

The fifth or bottom layer (405) is a board layer (B) consisting of a two-sided paperboard with a clay coated bottom first side (405b) for providing printability, and an uncoated second side (405a). The paperboard substrate used for the bottom board layer of the preferred embodiment is SBS (Solid Bleached Sulfate) 008" or 0.010", C1S (Coated 1 Side) board.

Preferably, the first and second paperboard layers (401, 405) are substantially structurally identical, in that they have substantially the same mechanical properties and are configured relatively symmetrically in relation to an axis formed along the core layer (403). In other words, the first paperboard layer (401) mirrors the second paperboard layer (405), in relation to the core layer (403). The resulting laminate is thus structurally symmetrical, in order to impart dimensional stability and avoid deformations of the laminate, such as warping, etc., when exposed to humidity or the like. Some minor differences between the first and second paperboard layers (401, 405) are permissible without compromising the dimensional stability of the laminate, as can be understood by a person skilled in the art. For example, one paperboard may be clay coated while the other one is not. Preferably, the first and second paperboard are made of the same material and have approximately the same thickness. However, in some cases, the paperboards may be made of different materials and/or of varying thickness, so long as they are suitably similar in terms of structure and properties to impart dimensional stability, as can be understood by the skilled reader.

Referring now to FIG. 5, there is shown method (500) of manufacturing a tear-resistant paperboard laminate, according to a tandem adhesive laminating process. Preferably, a two-sided tear-resistant film (501) travels from unwind roll (513) to metering & nip rollers (502). The first side of the tear-resistant film (501) is coated with a liquid adhesive A (503) by the nip roller (502). The adhesive-coated tear-resistant film (501) then travels to pressure rolls (505). A board A (504) travels from an unwind roll (514) to pressure rollers (505), where the adhesive coated first side of the tear-resistant film (501) comes in contact with the uncoated second side of board A (504) and they both enter between pressure rolls (505) to be joined together. The double-layered board-film laminate exiting the pressure rolls (505) then travels towards the anilox roller coating unit (506) where the second side of tear-resistant film (501) is coated with a liquid adhesive B (507) by the anilox roller (506). The adhesive-coated double-layered board-film laminate then travels to pressure rolls (509). Furthermore, a board B (508) travels from an unwind roll (515) to the pressure rollers (509). The adhesive-coated second side of the tear-resistant film (501) then comes in contact with the uncoated second side of the board B (508) and they both enter between the pressure rolls (509) to be joined together. The triple-layered board-film-board laminate existing from the pressure rolls (509) then travels through multiple rolls to a heat tunnel (510) where the adhesive of the laminate is properly cured and set. Then, the cured triple-layered board-film-board laminate exits the heat tunnel (510) and travels through chill rolls (511) for cooling before being transferred to a final laminate rewind roll (512).

Referring now to FIG. 6, there is shown method (600) of manufacturing a tear-resistant paperboard laminate, according to a tandem extrusion laminating process. Preferably, a two sided tear-resistant film (601) travels from an unwind roll (611) to a corona treatment chamber (602) to increase the surface tension or dyne level of the film. The two-sided tear-resistant film (601) exits the corona treatment chamber (602) and travels to a first extruder unit A (603) to be coated with molten LDPE. Thus, the first side of the tear-resistant film (601) is coated with molten LDPE (603). The molten-LDPE-coated tear-resistant film (601) then travels to pressure rolls (605). Moreover, a board A (604) travels from an unwind roll (612) to the pressure rollers (605). The molten-LDPE-coated first side of the tear-resistant film (601) comes in contact with the uncoated second side of the board A (604) and they both enter between the pressure rolls (605) to be joined together. The double-layered board-film laminate exiting the pressure rolls (605) then travels towards a second extruder unit B (606) where the second side of tear-resistant film (601) is coated with molten LDPE. Then, the adhesive-coated double-layered board-film laminate travels to pressure rolls (608). A board B (607) travels from an unwind roll (613) to the pressure rollers (608), where the adhesive-coated second side of the tear-resistant film (601) comes in contact with the uncoated second side of board B (607) and they both enter between the pressure rolls (608) to be joined together. Then, the triple-layered board-film-board laminate exiting from the pressure rolls (608) travels through a chill roll (609) for cooling before being transferred to a final laminate rewind roll (610). Preferably, a package such as a drug dispenser, has push tabs located on both narrow side panels in order to control the strength needed to open the package.

Referring now to FIG. 7 to 23, there are shown various packaging structures (700) and blanks (705). According to a preferred embodiment of the present invention, there is provided a packaging structure being made substantially of the tear-resistant paperboard laminate as described herein. Preferably, the packaging structure includes a first component (701) and a second component (702) being in sliding engagement with the first component (701), wherein at least one of the first and second components (701, 702) is made substantially of the tear-resistant paperboard laminate (400, see FIG. 4) described herein.

As shown in FIG. 7 to 16, the first component (701) forms a sleeve (703) and the second component (702) forms an insert (704) to slide along an inner wall of the sleeve (703). Preferably, the sleeve (703) is substantially made of the tear-resistant paperboard laminate described hereinabove. As exemplified, the sleeve (703) substantially encases the insert (704) which may be slidably engaged with a plurality of inner walls of the sleeve, or even with other inserts (704). Indeed, the packaging structure may comprise a plurality of inserts (704), each of which may be made substantially of the tear-resistant paperboard laminate. Accordingly, frictional resistance between the moving components is considerably reduced when compared to conventional laminates having one paperboard side and one film side.

Figure 17:
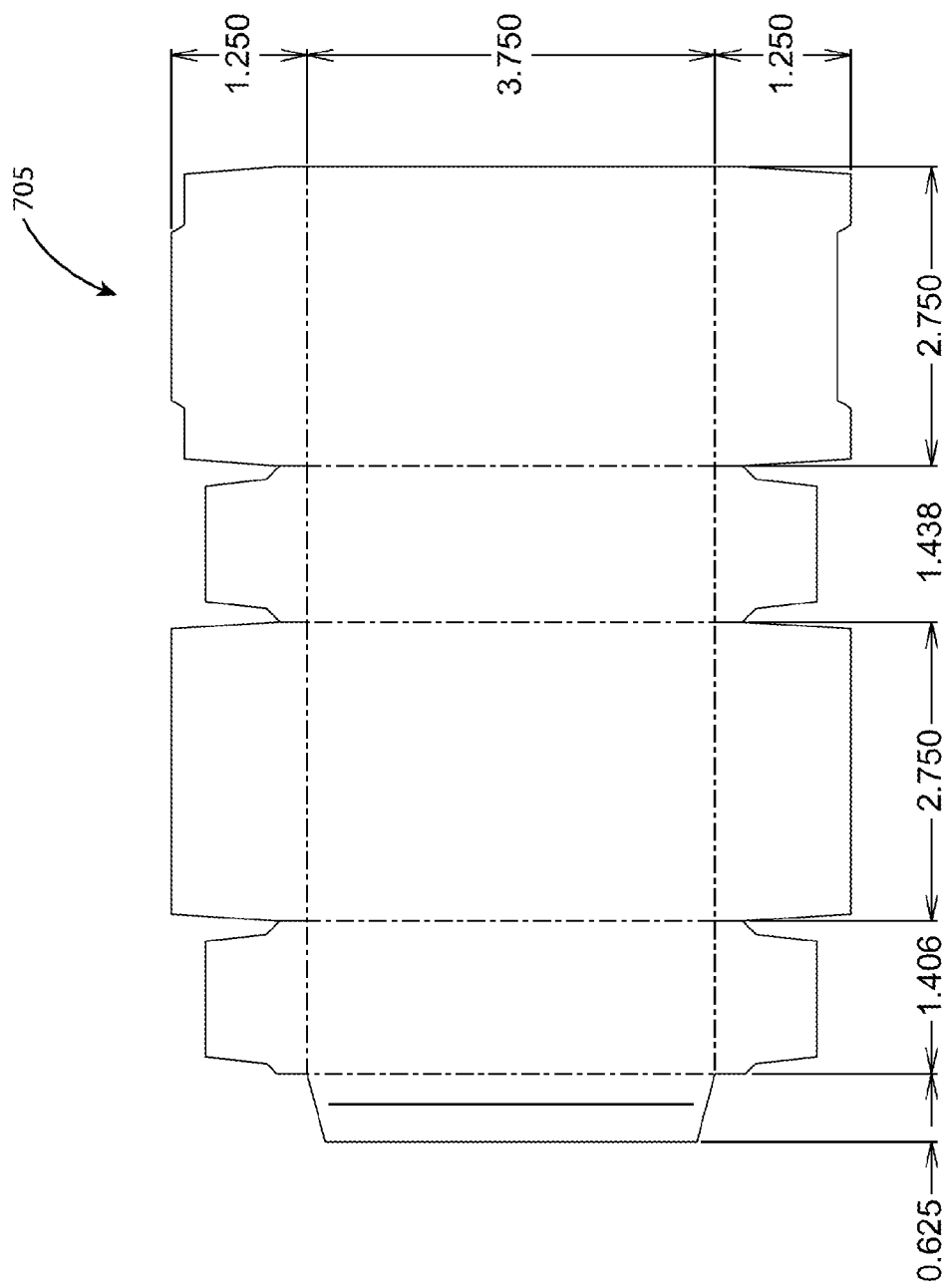
FIG. 17 shows a blank for forming a packaging structure according to an embodiment of the present invention.
Figure 18:
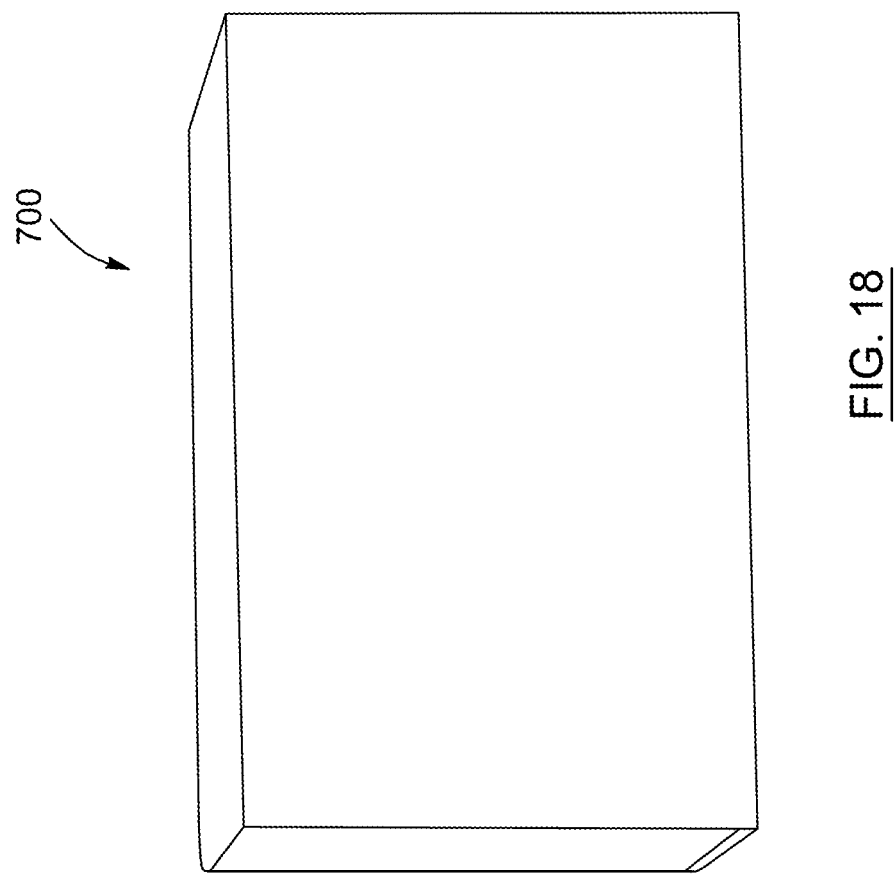
FIG. 18 shows a packaging structure according to yet another embodiment of the present invention.
Figure 19:
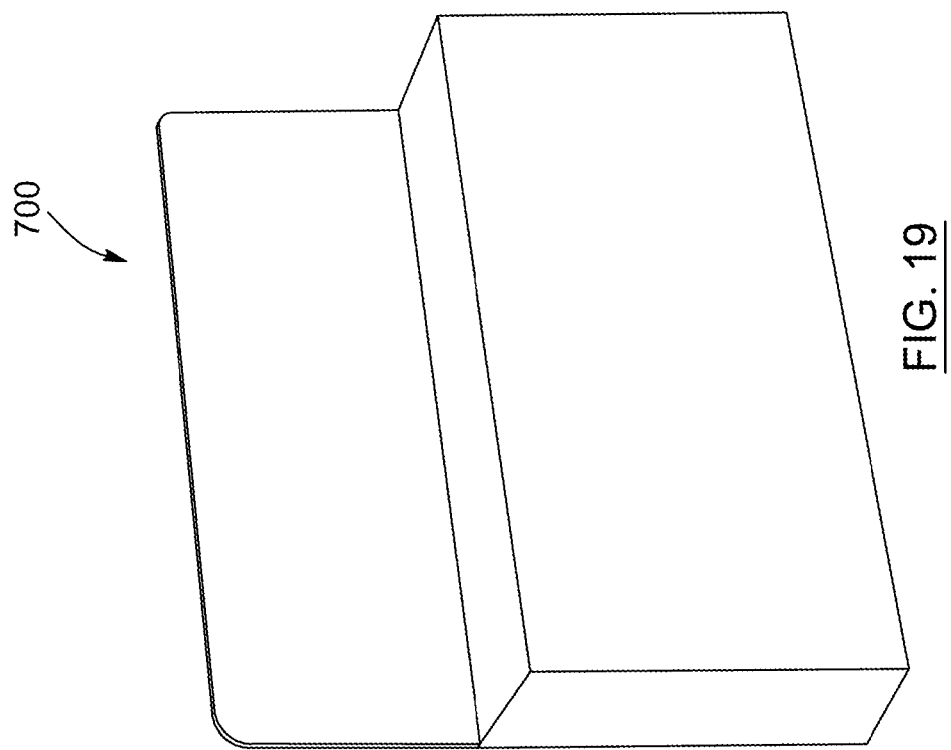
FIG. 19 shows a packaging structure according to yet another embodiment of the present invention.
Figure 20:
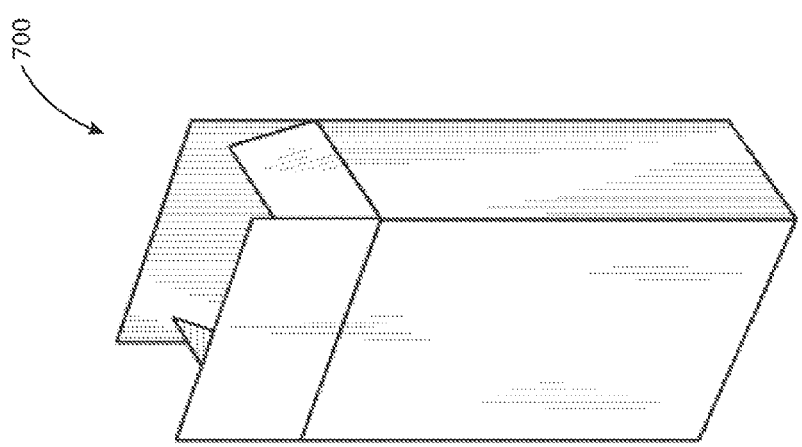
FIG. 20 shows a packaging structure according to yet another embodiment of the present invention.

Referring now to FIG. 17, there is shown a blank (705) for forming a packaging structure according to an embodiment of the present invention. The blank (705) is made from the tear-resistant paperboard laminate as described herein. FIGS. 18 and 19 show packaging structures (700) according to other embodiments of the present invention. FIG. 20 shows a packaging structure (700) according to yet another embodiment.

Figure 21:
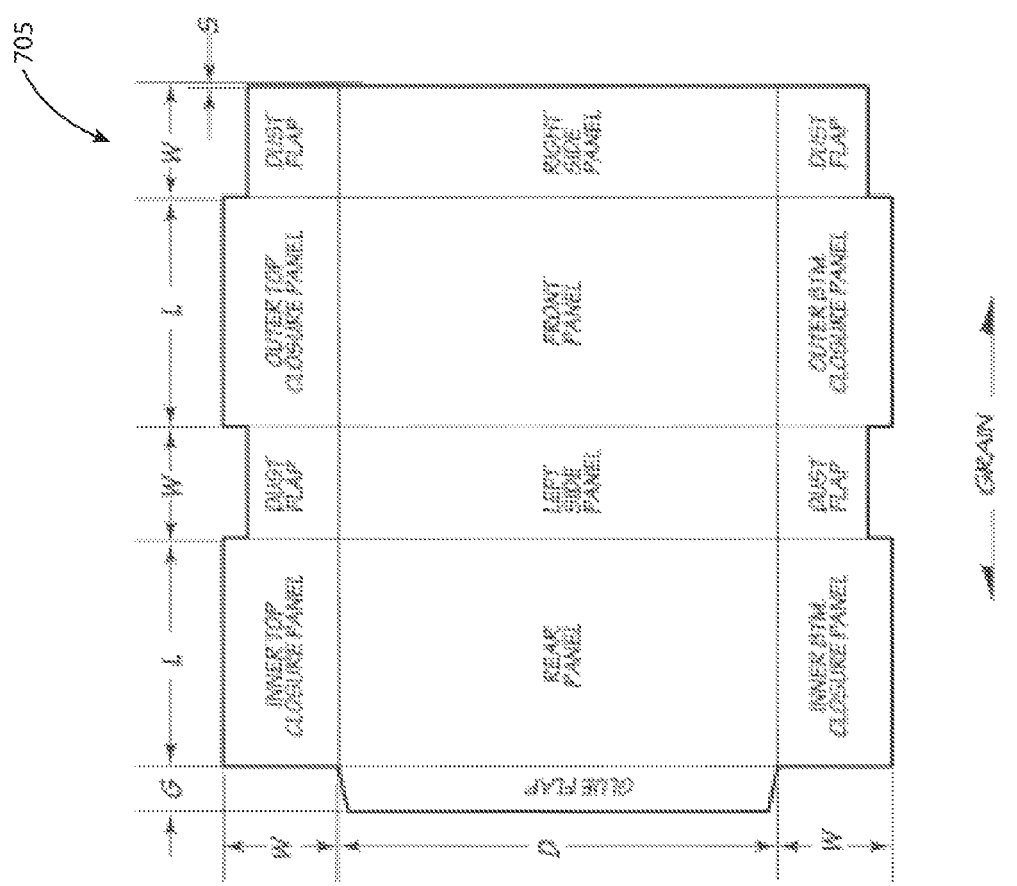
FIG. 21 shows a blank for forming the packaging structure shown in FIG. 20.
Figure 22:
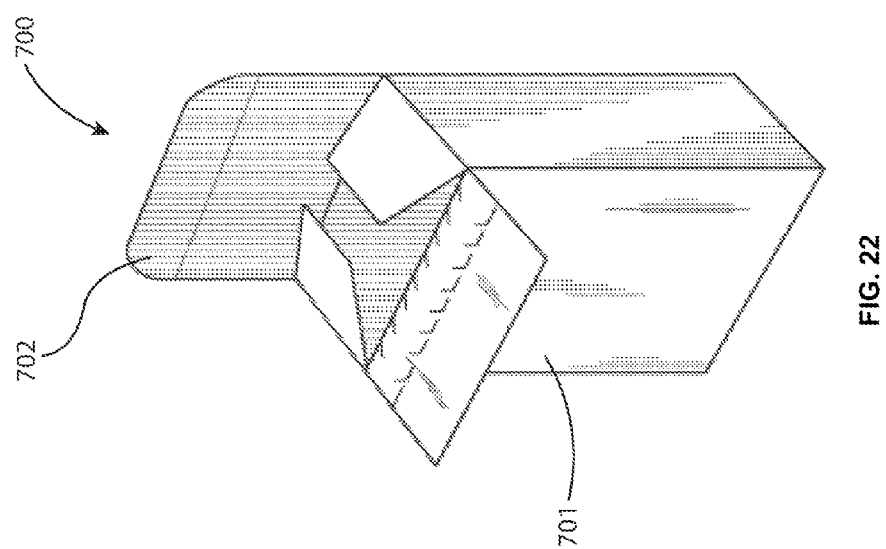
FIG. 22 shows a packaging structure according to yet another embodiment of the present invention.
Figure 23:
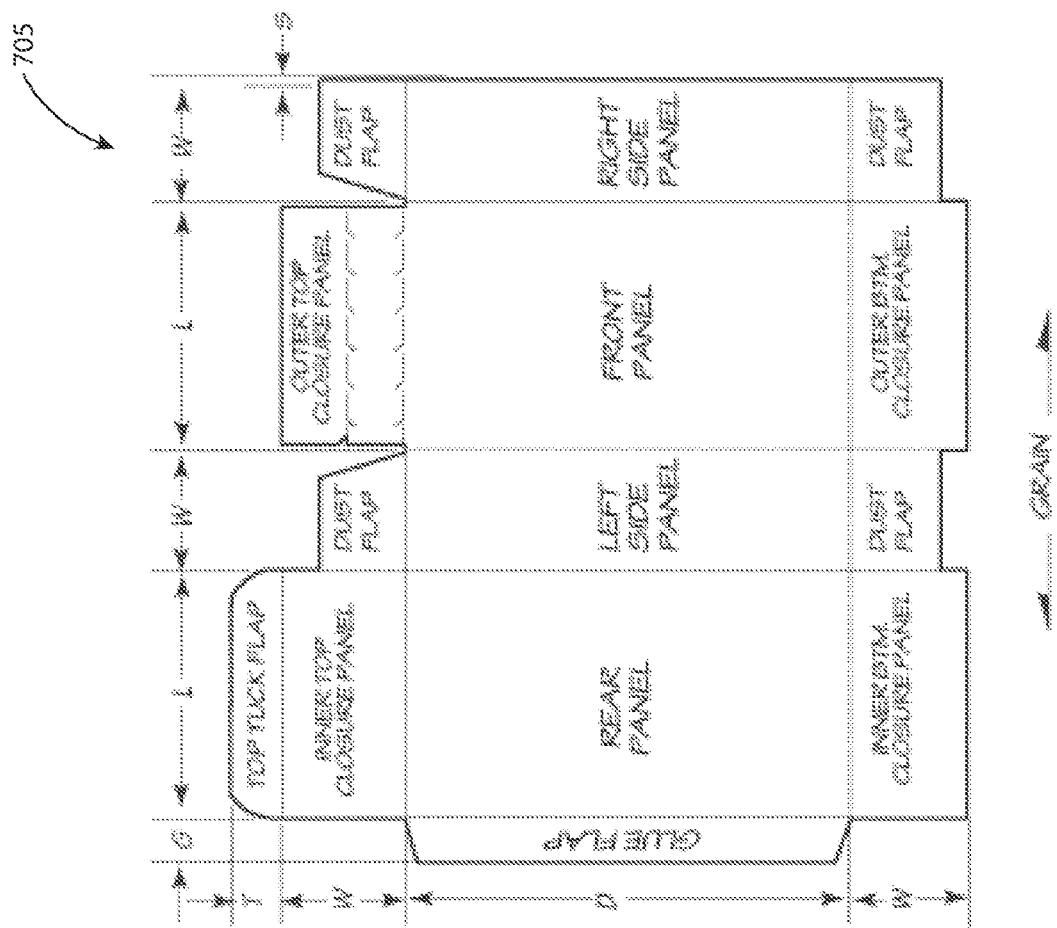
FIG. 23 shows a blank for forming the packaging structure shown in FIG. 22.

The blank (705) for forming this packaging structure (700) is shown in FIG. 21. FIG. 22 shows a packaging structure (700) according to yet another embodiment. The blank (705) for forming this packaging structure (700) is shown in FIG. 23.

Embodiments of the present invention are particularly advantageous in that the above-described laminated sandwiched structure combines inherent strength and tear-resistance of an integral multi-layer cross-directionally laminated film core and the machine process ability of top and bottom paperboard layers. Such laminate structures are useful for integration into pilfer resistant, high strength packages and other applications where high tear-resistance offers an advantage over existing paperboard structures.

Still advantageously, the packaging multi-layer tear-resistant paperboard laminate with an integral multi-layer, cross-directionally laminated construction of high-density polyethylene, according to embodiments of the present invention, has a tear strength of approximately 1700 grams of force in machine direction and 1050 grams of force in cross direction.

The paperboard-polymer-paperboard laminate, according to embodiment of the present invention, is particularly useful for child-resistant and senior-friendly packaging prototypes and can be printed, hot-stamped, embossed, die-cut and glued using conventional printing and converting techniques. Moreover, the resulting laminate may be easily bonded as board to board.

Several modifications may be made to the above-described tear-resistant paperboard laminate, system or process, without departing from the scope of the present invention, as can be easily understood by a person skilled in the art. Indeed and for example, the first and/or second paperboard layers may or may not be clay-coated, for example when printability is not required. Moreover, the first or second paperboards may have substrates of varying thicknesses such as various CCNB (Clay Coated News Back) recycled boards, DWL (Double White Lined) boards or the like. Furthermore, the tear-resistant polymer film may be of varying thicknesses and may be made of various suitable materials such as polyester, polyamide, polyurethane and/or the like. Still alternatively, other embodiments may be provided using single conventional adhesive or extrusion laminating processes rather than the tandem laminating processes of the preferred embodiment combined with different paperboard substrates of varying thicknesses and other tear-resistant polymer films of varying thicknesses.

Numerous other modifications may be made to the above-described tear-resistant paperboard laminate, without departing from the scope of the present invention. Indeed, the above-described embodiments are considered in all respect only as illustrative and not restrictive, and the present application is intended to cover any adaptations or variations thereof, as apparent to a person skilled in the art.

The invention claimed is:

1. A tear-resistant paperboard laminate for making a tear-resistant packaging structure, said tear-resistant paperboard laminate comprising:
   a tear-resistant polymer core layer having first and second opposite sides;
   a first paperboard layer bonded to the first side of said tear-resistant polymer core layer, with a first bonding medium;
   a second paperboard layer bonded to the second side of said tear-resistant polymer core layer, with a second bonding medium;
   wherein said tear-resistant polymer core layer has a tear resistance of at least 350 grams of force in machine direction and of at least 400 grams of force in cross direction, as measured by the Elmendorf tear propagation test.

2. The tear-resistant paperboard laminate according to claim 1, wherein the tear-resistant polymer layer core has a tear resistance of at least 1700 grams of force in machine direction and of at least 1050 grams of force in cross direction, as measured by the Elmendorf tear propagation test.

3. The tear-resistant paperboard laminate according to claim 1, wherein the tear-resistant polymer layer core is a corona treated integral multi-layer, cross-directionally laminated construction.

4. The tear-resistant paperboard laminate according to claim 1, wherein the first and second paperboard layers are substantially structurally identical.

5. The tear-resistant paperboard laminate according to claim 1, wherein at least one of the first paperboard layer and the second paperboard layer is clay coated on an external side thereof, for providing printability.

6. The tear-resistant paperboard laminate according to claim 1, wherein at least one of the first and second bonding media comprises an adhesive material.

7. The tear-resistant paperboard laminate according to claim 1, wherein at least one of the first and second bonding media comprises extrusion-applied molten LDPE (Low Density Polyethylene).

8. The tear-resistant paperboard laminate according to claim 1, wherein at least one of the first and second paperboard layer comprises a substrate, wherein the substrate comprises at least one of: SBS (Solid Bleached Sulfate) 0.008" or 0.010", C1S (Coated 1 Side) board, CCNB (Clay Coated News Back) recycled board 0.008" or 0.010", and DWL (Double White Lined) board 0.008" or 0.010".

9. The tear-resistant paperboard laminate according to claim 1, wherein the tear-resistant polymer layer core is made of at least one of Valeron™, polyester, polyamide or polyurethane films.

10. The tear-resistant paperboard laminate according to claim 1, wherein the tear-resistant polymer layer core has a thickness ranging from 1 to 3 mils.

11. A packaging structure being made substantially of the tear-resistant paperboard laminate according to claim 1.

12. A packaging structure comprising a first component and a second component being in sliding engagement with the first component, wherein at least one of the first and second components is made substantially of the tear-resistant paperboard laminate according to claim 1.

13. The packaging structure according to claim 12, wherein the first component forms a sleeve made substantially of the tear-resistant paperboard laminate and the second component forms an insert to slide along an inner wall of the sleeve.

14. The packaging structure according to claim 13, wherein the sleeve substantially encases the insert, the insert being slidably engaged with a plurality of inner walls of the sleeve.

15. The packaging structure according to claim 12, further comprising one or more inserts being substantially made of the tear-resistant paperboard laminate.

16. A dimensionally stable tear-resistant paperboard laminate for making a tear-resistant packaging structure, said dimensionally stable tear-resistant paperboard laminate comprising:
   a tear-resistant polymer core layer having first and second opposite sides;

a first paperboard layer bonded to the first side of said tear-resistant polymer core layer, with a first bonding medium;

a second paperboard layer bonded to the second side of said tear-resistant polymer core layer, with a second bonding medium;

wherein said tear-resistant polymer core layer has a thickness of at least 1 mil and a tear resistance of at least 350 grams of force in machine direction and of at least 400 grams of force in cross direction, as measured by the Elmendorf tear propagation test and wherein the first and second paperboard layers are substantially structurally identical.

17. A dimensionally stable tear-resistant paperboard laminate according to claim 16, wherein said tear-resistant polymer core layer has a thickness of at least 3 mils and a tear resistance of at least 1700 grams of force in machine direction and of at least 400 grams of force in cross direction, as measured by the Elmendorf tear propagation test.

\* \* \* \* \*